(12) United States Patent
Chow

(10) Patent No.: US 12,222,972 B2
(45) Date of Patent: Feb. 11, 2025

(54) SMART CONNECTION MANAGEMENT FOR OPTIMAL NETWORK ACCESS

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 0 days.

(21) Appl. No.: 17/080,820

(22) Filed: Oct. 26, 2020

(65) Prior Publication Data

US 2021/0042337 A1 Feb. 11, 2021

Related U.S. Application Data

(63) Continuation of application No. 14/949,706, filed on Nov. 23, 2015, now Pat. No. 10,817,555.

(51) Int. Cl.
*G06F 16/00* (2019.01)
*G06F 16/2457* (2019.01)
*G06F 16/335* (2019.01)
*G06F 16/9535* (2019.01)

(52) U.S. Cl.
CPC ...... *G06F 16/337* (2019.01); *G06F 16/24578* (2019.01); *G06F 16/335* (2019.01); *G06F 16/9535* (2019.01)

(58) Field of Classification Search
CPC ............... G06F 16/337; G06F 16/335; G06F 16/24578; G06F 16/9535
USPC .................................................. 707/722
See application file for complete search history.

(56) References Cited

U.S. PATENT DOCUMENTS

| | | | | |
|---|---|---|---|---|
| 7,805,140 | B2* | 9/2010 | Friday | H04W 48/20 455/436 |
| 9,386,427 | B1* | 7/2016 | Narasimhan | H04W 4/14 |
| 10,430,899 | B2* | 10/2019 | Kim | H04W 4/02 |
| 2002/0026335 | A1* | 2/2002 | Honda | G06Q 40/08 714/E11.125 |
| 2002/0112152 | A1* | 8/2002 | VanHeyningen | H04L 63/0457 713/151 |
| 2002/0129027 | A1* | 9/2002 | Cameron | G06Q 10/10 |
| 2002/0138551 | A1* | 9/2002 | Erickson | H04L 67/568 709/227 |
| 2006/0004927 | A1* | 1/2006 | Rehman | G06F 16/95 709/250 |
| 2006/0161635 | A1* | 7/2006 | Lamkin | G06F 16/16 709/217 |
| 2006/0187873 | A1* | 8/2006 | Friday | H04W 48/20 370/328 |
| 2006/0198296 | A1* | 9/2006 | Majee | H04L 69/14 370/216 |
| 2007/0032225 | A1* | 2/2007 | Konicek | F24F 11/62 455/417 |

(Continued)

*Primary Examiner* — Vincent F Boccio

(57) ABSTRACT

An invention is disclosed for systems, methods, processes, and products, including but not limited to, one that provides for user communication and interaction with as well as access to resources available on or via a computing device. An embodiment of the invention includes providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

26 Claims, 20 Drawing Sheets

(56) References Cited

U.S. PATENT DOCUMENTS

| | | | |
|---|---|---|---|
| 2008/0240112 A1* | 10/2008 | Muqattash | H04W 40/28 370/395.31 |
| 2010/0285793 A1* | 11/2010 | Yoon | H04W 48/16 455/422.1 |
| 2012/0196644 A1* | 8/2012 | Scherzer | H04W 48/18 455/524 |
| 2013/0152175 A1* | 6/2013 | Hromoko | H04W 36/0011 709/206 |
| 2014/0026188 A1* | 1/2014 | Gubler | H04W 12/12 726/3 |
| 2014/0195026 A1* | 7/2014 | Wieder | G06F 16/639 700/94 |
| 2015/0245388 A1* | 8/2015 | Yerrabommanahalli | H04L 65/1016 455/404.1 |
| 2015/0269624 A1* | 9/2015 | Cheng | G06Q 30/0267 705/14.58 |
| 2016/0085648 A1* | 3/2016 | Joshi | G06F 11/2041 714/4.11 |
| 2016/0203522 A1* | 7/2016 | Shiffert | H04L 67/104 705/14.58 |
| 2016/0374101 A1* | 12/2016 | Dahlman | H04L 41/5009 |

* cited by examiner

SMART CONNECTION MANAGEMENT FOR OPTIMAL NETWORK ACCESS

CROSS REFERENCE TO RELATED APPLICATIONS

This application is a continuation of U.S. application Ser. No. 14/949,706, filed Nov. 23, 2015, which is hereby incorporated by reference in its entirety.

TECHNICAL FIELD

The present invention relates to systems, methods, processes, and products for, including but not limited to, user communication and interaction with as well as access to resources available on or via a computing device.

BACKGROUND

The World Wide Web (or simply called the Web) has made dissimilation and publication of digital resources (e.g., webpages, news, blogs, statements, photos, opinions, offers, music, videos, applications) so easy that a pyramid of digital resources of various kinds are available online. It has become difficult for many online users to decide what to read or consider, or to uncover digital resources of interest to him or her.

There are systems that allow an online user to positively or negatively rate a certain piece of news, article, opinion, or some other information item of a certain topic. Such a system displays, advertises, or otherwise publishes these information items that are deemed by the system as the most recommended or the more favorable based on such user recommendations. These selected information items are herein collectively referred to as prize digital resources. Digital resources such as news items may be made popular through resource sharing or social networking websites. Substantial online content that attracts advertising revenues or becomes widely known have originated or otherwise receive recommendation via these websites and systems.

However, the current art treats the membership population of these websites and systems as homogeneous, where members having diverse or heterogeneous interests may not easily be able to discover or share their content of interest more efficiently or widely, while contributing to the overall relevancy of such content to the population as a whole. For instance, the prize digital resources so determined in accordance to the current art purportedly represent the interest of the whole population or community, when in fact the online users are heterogeneous (by nature or otherwise, such as age, nationality, gender, religion, and so on). This simplistic approach does not facilitate information dissemination of interest to relevant parties. In addition, it might encourage an online user to game or manipulate the systems or their ranking/rating methods so that the articles, news, opinions, and information items of other kinds that they have a vested interest in promoting would become prize digital resources. Other online users who want to see their favorite digital resources unsuppressed by the prize ones would either do their own counter gaming or manipulation, or simply be regarded not as a group of people whose interests are not "important" enough to be heard or seen.

In addition, a computing apparatus or device may be equipped with a means to authenticate a user for access. However, there may be applications or functions (herein referred to as apps) on the device that a user would access or use often but not wanting the need for device-level authentication every time he wishes to do so. On the other hand, some apps may provide their own authentication (optional or otherwise), so that a user may disable authentication for the device, and rely on such app-specific authentication. In this case, the user needs to be authenticated individually by these apps, and manage the credentials (e.g., user name and password) for all these apps. In addition, when a device communicatively coupled to a user may lack network connectivity, or roam overseas thereby incurring additional charges, the user who is using the same online service as another user would not be able to access the service or to do so more cheaply, even though a device of the other user does have network connectivity to communicate with the service and can do so at no extra charges or at a cheaper rate, and the device of the user can be communicatively linked to the device of the other user. Also, when composing or editing a message, a user may select from existing text, whether from the message being composed or from another message. The current art of text selection, e.g. for copy (or cut) and paste, on a mobile phone with a touchscreen may require operation with the other hand that is not holding the device, or involve multiple precise taps, touches and/or drags that may take undue effort or time. For example, some messaging application may even disable or disallow selection of a portion of text from an existing message, therefore forcing a user to select and copy the complete message, and to paste it elsewhere and delete the unwanted part(s) therein.

Moreover, a mobile device such as a mobile phone or a mobile hot-spot may have more than one wireless access point in a network or more than one network to associate with or connect to, and it often relies on signal strengths or link quality as the primary factors in choosing an access point, given that the mobile device has access rights to the available access points or networks. While the mobile device is actively associated with a specific access point of a wireless network, it again often relies on signal strengths or link quality to determine if it should look for another access point or network to join. For example, the mobile device would stay put if the performance of the currently associated access point is above a certain threshold. This approach could cause the mobile device to stay with a wireless network and ignore another available network with better connection or connectivity to the Web or the Internet. Furthermore, while a mobile phone may be configured to prefer a Wi-Fi network over a cellular network, it often cannot distinguish which Wi-Fi network is better based on other than signal strengths or link quality. For example, a mobile hot-spot or Wi-Fi device may provide Internet connectivity to a mobile phone through cellular data at an expensive rate, and yet the mobile phone may remain connected to the mobile hot-spot or Wi-Fi device even when the mobile phone is within a good connectivity range of a home Wi-Fi network at no extra cost.

SUMMARY

The present invention solves the above problems and related issues by providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

Disclosed are techniques for rating a digital resource among heterogeneous groups of users in hubs. In embodiments, a hub provider makes available the digital resource to a first hub and a second hub, the first hub comprising a first plurality of members and the second hub comprising a second plurality of members, the first plurality of members differing from the second plurality of members, each member having a member account. In embodiments, one member may be a group of both the first and second pluralities of members, though the sets of members in the first and second pluralities of members differ. The hub provider may then receive a first rating for the digital resource from a first member of the first hub, and receive a second rating for the digital resource from a second member of the second hub. The hub provider may then determine a first hub-level score for the first hub based on the first rating; determine a second hub-level score for the second hub based on the second rating; and determine an overall score for the digital resource based on the first hub-level score and the second hub-level score. The hub provider may store an indication of the first hub-level score, second hub-level score, and overall score in a memory.

Disclosed are methods and systems for distributing digital resources and identifying prize resources and their contributors among heterogeneous users. For instance, a method for selecting more than one set of digital resources among a plurality of digital resources is described, the method comprising: (a) making available a plurality of digital resources in a plurality of hubs, each hub having a plurality of members, wherein each member may be associated with a home hub; (b) presenting the plurality of digital resources to the plurality of members in the plurality of hubs; (c) accepting a member rating from the plurality of members against the plurality of digital resources, wherein the member rating includes a favorable rating or an unfavorable rating; (d) determining a hub-level score for each of the plurality of hubs against one or more digital resources of the plurality of digital resources based at least in part on the member rating; (e) determining an overall score against each of the one or more digital resources based at least in part on the hub-level score; and (f) selecting more than one set of digital resources, a set based at least in part on the overall score and another set based at least in part on the hub-level score in relation to one of the plurality of hubs, wherein the set and the other set include an ordered list of references to digital resources.

In relation to this method, the plurality of digital resources may include one or more digital resources being available in two or more hubs of the plurality of hubs. Each of the more than one set of digital resources may include one digital resource or one or more references to digital resources, and the plurality of members may include a plurality of email addresses. In addition, the making available a plurality of digital resources may include storing the plurality of digital resources, hubs, and user accounts in a database, and selecting the more than one set of digital resources may include storing the more than one set of digital resources in the database. The making available may also include receiving submissions from the plurality of members, the submissions including digital resources or references to the digital resources and member ratings, wherein the references may include URLs. The selecting may also include presenting the set of digital resources to the plurality of members and the other set of digital resources to members of the hub having the other set of digital resources associated with the hub-level score. Furthermore, the accepting a member rating may include considering the member rating only for the home hub. Each of the plurality of members may belong to only one of the plurality of hubs. The method may further comprise: (a) determining eligibility of a user for membership of a hub, wherein the determining includes what the user is, where the user claims to reside or is located, what the user claims to believe, what the user can do, or what digital resources the user has given a favorable rating against; (b) accepting the user as a member if the user is determined to be eligible; (c) rejecting the user as a member if the user is determined to be not eligible. (d) determining if a member should be removed from a hub; and (e) removing the member from the hub, if the member is determined to be removed; and keeping the member in the hub, if the member is determined not to be removed.

Moreover for the method, the determining if a member should be removed may include detecting a certain number of prize digital resources in the hub receiving an unfavorable rating from the member over a period of time or among a number of prize digital resources, and detecting a plurality of digital resources each receiving a favorable rating from the member and not becoming a prize digital resource in the hub over a period of time or among a number of digital resources available in the hub.

The method may further comprise: (a) determining a prize user based at least in part on the set of digital resources, wherein the prize user has submissions comprising one or more resources in the set; (b) determining a prize member based at least in part on the other set of digital resources, wherein the prize member has submissions comprising one or more resources in the other set; and (c) determining a prize hub based at least in part on the set of digital resources, wherein the prize hub has a hub-level score for one or more resources in the set.

The present invention also includes a system for generating a plurality of selections of resources from a plurality of resources, comprising: (a) a hub storage medium for storing a plurality of hubs in a database; (b) a user storage medium for storing a plurality of user accounts in a database; (c) a resource storage medium for storing a plurality of resources in a database; (d) a relationship storage medium for storing a plurality of relationships in a database; (e) a communication interface module configured to send and receive data to and from a user via a user device over a network, the user having a user account in the user storage medium, the user having a membership relationship between the user account and one or more of the plurality of hubs in the relationship storage medium, and the data including one or more submissions, each having a recommended resource or a rating, the recommended resource comprising a reference to a resource, and the rating comprising a target resource, wherein the target resource includes a recommended resource; (f) a user interface module configured to interact with the user or the user device, the interacting including receiving the one or more resource submissions, and presenting a selection of digital resources to the user or the user device; (g) a submission handler module configured to receive one or more recommended resources and ratings; (h) a resource analyzer module configured to determine if each of the one or more recommended resources exists in the resource storage medium, and add the recommended resource to the resource storage medium if the recommended resource does not already exist in the resource storage medium, the recommended resource including an overall score, a user account, and a timestamp; (i) a resource distributor module is configured to determine if an availability relationship between the recommended resource and each of the one or more hubs exists in the relationship storage medium, and add an availability relationship between the recommended resource and the hub in the relationship storage medium if the availability relationship does not already exist in the relationship storage medium, the availability relationship including a hub-level score, a user account, and a timestamp; (j) a score generator module is configured to determine if an availability relationship between each of the one or more target resources and each of the one or more hubs exists in the relationship storage medium, and update the hub-level score in the availability relationship based at least in part on the rating if the availability relationship exists in the relationship storage medium, and to update the overall score in the target resource in the resource storage medium based at least in part on the hub-level score; (k) a list maker module configured to generate a plurality of selections of digital resources, one selection based at least in part on the overall scores of the digital resources in the resource storage, and the other selections based at least in part on the hub-level scores of the digital resources for the one or more hubs, the generating including presenting the plurality of selections to the user via the user device, wherein the one selection includes the overall scores, and the other selections include the hub-level scores; and (l) a membership controller module configured to determine if an availability relationship between a resource and each of the one or more hubs exists in the relationship storage medium the availability relationship having the user account and a timestamp within a certain period of time, and remove the membership relationship between the user account and the hub in the relationship storage medium if the availability relationship does not exist, wherein the certain period of time includes three months.

In addition, according to one embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful. According to another embodiment, an authorized user may send and receive messages via another device that belongs to another user based on identification of the user by the other user.

Furthermore, a computer-implemented method for selecting text is disclosed. According to one embodiment, for instance, a computing device may identify user contact with a touchscreen display of the computer device that includes a finger that initiated contact with the touchscreen display in text that is displayed by the touchscreen display. The computing device may determine that the finger has remained in contact with the touch screen display for a pre-defined period of time, without the finger having released from the contact with the touchscreen display. In relation to determining that the finger has remained in contact with the touch screen, the computing device may present at the touchscreen display a first indication that a set of characters in the text are selected based on at least the location of the contact in the text, wherein the set of characters comprises one or more characters, and the set of characters increases temporally to include additional characters in the text, without the finger or another finger having had contact with the additional characters. The computing device may determine that the finger has released from the contact with the touchscreen display, and present a second indication that the set of characters in the text are selected, wherein the set of characters stops increasing.

A non-transitory computer-readable storage device is also disclosed, the storage device having instructions stored therein that, when executed by one or more programmable processors, cause the one or more programmable processors to, according to one embodiment, perform operations comprising: (a) identifying, by a computing device, an indication of a first gesture, wherein the first gesture comprises user contact with a touch-sensitive surface associated with the computer device; (b) determining, by the computing device, that the user contact stays within a pre-defined distance from a location on the touch-sensitive surface, wherein the location is associated with text that is displayed on a display, and the location is associated with the first gesture; (c) in relation to determining, by the computing device, that the user contact stays within the pre-defined distance, presenting at the display, by the computer device, an indication of text selection, wherein the text selection increases temporally to comprise additional text, independently of more user contact with the touch sensitive surface; and (d) in relation to determining, by the computing device, that the touch sensitive surface is free of the user contact, presenting at the display, by the computing device, an indication of the text selection, wherein the text selection stops increasing.

Moreover, a computer-implemented method of controlling a communication network, e.g., a wireless network, is disclosed. According to one embodiment, a computer system may determine that a condition is met, wherein the condition is associated with presence of a device capable of wireless transmission, and cause a first connectivity to be unavailable to a client, wherein the first connectivity is associated with the computer system, and the client is external to the computer system. According to another embodiment, a computer system may determine that a connectivity is available, and cause another connectivity to be unavailable, wherein the other connectivity is associated with the computer system. According to yet another embodiment, a computer system may determine that a network connection is available, and cause another network connection to be unavailable, wherein the other network connection is associated with the computer system.

Objects and Advantages

Embodiments of the present invention provide, among other objects and advantages, access control to a collection of apps, and access to them needs not be individually authenticated. These apps may also be made invisible or opaque for privacy purposes. Different levels of app availability may also be made available so that only a subset of apps is visible and accessible to a user. For example, one level may be configured to make visible and accessible apps intended for children, while hiding other apps.

DETAILED DESCRIPTION OF ILLUSTRATIVE EMBODIMENTS

Figure 1:
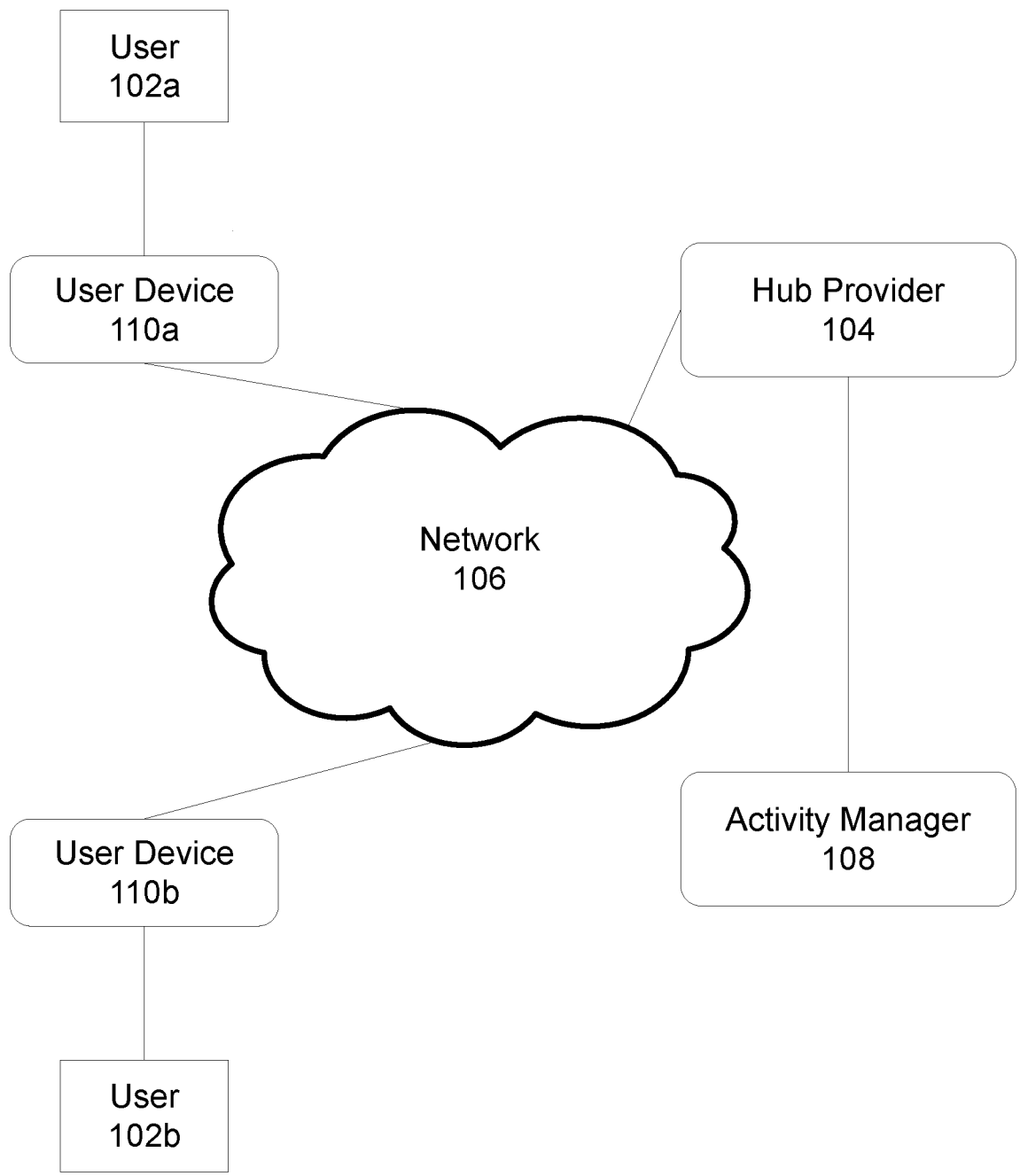
FIG. 1 illustrates an exemplary environment for distributing digital resources and identifying prize resources and their contributors among heterogeneous users.

A digital resource hub (or simply hub herein) provides dissemination or distribution of digital resources (or simply resources herein) to its users. A user may rate resources to recommend them or otherwise increase their visibility to other users. A hub may limit its access to members. Membership may simply entail a registration (e.g., by email address) or criteria pertaining to a user's physical characteristics (e.g., gender, age, ethnicity), location (e.g., residence, current position), beliefs (e.g., religion, political views), ability (e.g., language, IQ test score), and so on. Membership may also be established or determined continually or per some session or operation, such as those based on GPS positions, personal interests at the moment, and so on. For example, a hub provider may create a plurality of multi-level hubs based on geographical positions for recommended beverage and food. The finest level may represent a radius of 50 meters or an area of 50 times 50 meters square, with a higher level being a composite of four of the previous level (i.e., 100 times 100, 200 time 200, and so on). The geographical extent or coverage of a hub (or its center and dimensions relative to the center) may be pre-assigned by the hub provider, or is determined relative to the position where the user is at the moment of his request for lists of relevant resources (i.e., those of recommend food and beverage), or some combination thereof. The hub provider may respond to a user's location-specific query with a plurality of resource lists, each comprising highly recommended food and beverage items at each level of area coverage, except at the lowest level, based at least in part on the hub-specific scores at the lower levels, whose score would be determined based at least in part on ratings given by users in the geographical area corresponding to that level.

Members may assume different roles as administrators, scouts, reviewers and observers, each of which might require a different set of membership criteria. Administrators or a hub authority may be creators or owners of a hub. Scouts are members who may submit or recommend resources to the hub. Reviewers are those who may provide ratings for resources available in the hub. Observers may access the resources but may neither bring resources into the hub nor provide any rating. Any type of membership role is within the scope of various embodiments. According to one embodiment, a member may assume multiple membership roles.

An authority of a hub may establish or otherwise choose rules for operation, administration and maintenance of the hub, such as those for membership, resource submissions, and resource import and export. There may be multi-tiered levels of authority, where the higher level may delegate some power to the lower level. For instance, a hub provider may assume the highest level of authority for all hubs under its jurisdiction while a hub administrator is responsible for a particular hub. For example, a local hub authority (e.g., a hub administrator) may choose for a hub the applicable membership roles as made available by the hub provider, and have each member assigned to its intended role, centrally or otherwise, while the hub provider may be responsible for rules in ranking resources in the hub based at least in part on ratings given by members of the hub. A hub authority may decide whether to make available to other hubs resources as discovered or otherwise submitted by the hub's members, and if so, under what criteria, if any. Likewise, a hub authority may decide if his hub would accept such public resources, and if so, under what criteria, if any. A hub authority may also decide the circumstances under which a member be removed from the hub. A hub authority may further be established by some voting scheme, where a new hub administrator or new rule may be elected or enacted by a majority of qualified members (e.g., where observers are not allowed to vote).

A hub may present or otherwise make available a plurality of lists of resources, such as the latest and the prize, which may be updated continuously, periodically, or from time to time. The latest list shows a list of resources whose order is mainly influenced by chronological considerations, e.g., from the most recent to the least. (The latest list may comprise resources submitted or otherwise recommended by the hub's members, imported from other hubs, or received as public resources). The prize list shows a list of resources whose order is mainly influenced by relevancy considerations, e.g., from most popular to the least, where the more recent may be considered more popular when all other factors are equal. In embodiments, a user or member may provide a rating against a resource on each of the two lists. According to one embodiment, only one rating is counted for a resource for each unique user or member, and should the user or member belong to more than one hub, then a home hub or a hub priority list would be established to determine which hub should receive the rating in question. A user's hub priority list identifies a plurality of hubs whose hub-level scores may include the user's rating. In one embodiment, the weight of the user's rating may decrease gradually for hubs on the lower order of the hub priority list.

For each hub, the prize list of resources would usually demand more attention from its members than the latest list. This may result in resources on the former list (namely prize resources) attracting more ratings from members who would have otherwise missed them, e.g., the members' not checking out resources on the latest lists (namely latest resources). Given the potential heterogeneity of hubs and their constituent members, a resource may be popular in one hub while barely known in another, even though it might have appeared on the latest lists of both hubs. A hub provider enables the existence of a plurality of hubs that may accommodate different interests and intents. No one single homogenous group of users may easily dominate the opinions about resources and take control of their dissemination under a single jurisdiction. As such, a resource has a much better chance of reaching an appreciative audience.

In addition, a resource may obtain different ratings or scores from a plurality of hubs, and an overall score may be derived based on these hub-level scores. In embodiments, the hub-level scores assigned to different hubs are normalized or otherwise made according to the same scoring system, such that they may be directly compared with each other, and combined to create an overall score. Such an overall score may help determine the relevancy of a resource to a population under a jurisdiction (e.g., that of a hub provider). Furthermore, a prize user, member or hub may be identified, when a user, a member or a hub's members are consistently discovering prize resources, at the hub or provider level.

According to one embodiment, a hub is regarded as an organization characterized by a culture realized via some membership criteria and agreements which may include considerations in beliefs, languages, age, gender, religion, professional affiliation, and so on. Users not compatible with or otherwise interested in one organization may have membership with other organizations (i.e., hubs). Existing members may lose their membership should they fail to fulfill the membership criteria or agreements imposed by the hub in question. Like minded would gradually gather at appropriate hubs, whose otherwise heterogeneous cultures would help not only to promote resources of interest to their peers and members, but also identify and select popular or prize ones for all users in the hub provider as a whole. According to one embodiment, the hub provider may be a social network, and hubs may be groups within the social network. According to another embodiment, the hub provider may comprise a collection of entertainment and news providers, and a hub may comprise individuals, a group, a company, or an organization subscribing to services of any of these entertainment and news providers.

FIG. 1 illustrates an exemplary environment for distributing digital resources and identifying prize resources and their contributors among heterogeneous users. A plurality of users 102a, 102b are communicatively coupled to a hub provider 104 via their respective user devices 110a, 110b to a network 106. The hub provider 104 may comprise a plurality of hubs (not shown) each associated in membership with one or more of the plurality of users 102a, 102b. According to one embodiment, the hub provider 104 may interact with a plurality of users 102a, 102b at their devices via a website. A user may search, join, create and visit a hub on the website. According to some embodiments, an administrator may set up rules for membership subject to constraints, if any, by the hub provider 104.

A hub may be realized as a website where any user 102a, 102b of the hub provider 104 may view or access content therein, including a list of most recent resources and a list of current prize resources, and where only authenticated users 102a, 102b may submit or recommend resources to the hub of which they are a member. An authenticated user 102a, 102b may submit a resource via a submission page of the website, a toolbar on a Web browser, a submission link for the hub provider 104 carried by a third-party website, or some other mechanisms whereby a resource or a reference (e.g., URL) to a resource may be submitted by a user 102a, 102b along with a user identity known to the hub provider 104. Any type, scheme, or mechanism of submission is within the scope of various embodiments.

The hub provider 104 may cache or otherwise retrieve a copy of the resource in question, and create a new reference to the copy for backup or faster retrieval, while maintaining the original reference and making it available to its users 102a, 102b. In addition, a user 102a, 102b may specify a submission as private, in that only a designated hub (e.g., a hub to which he is a member) may receive the submission.

In one instance, a user 102a, 102b associated with a user device 110a, 110b requests a resource (e.g., via a reference such as a URL) from the latest resource list of a hub. Once authenticated as a member of the hub, the user 102a, 102b may provide a rating against the resource. The resource may be made available on the current prize resource list of the hub should the hub provider 104 determine that the resource has attained a certain score, whether or not in relation to other resources available in the hub. On the prize resource list, the resource may continue to receive ratings (positive or negative) from members who have not rated it yet. The resource may be removed from both the prize and latest list if it no longer satisfies the criteria that govern the selection of resources for either of the lists.

An activity manager 108 is coupled to the hub provider 104. The activity manager 108 monitors or receives user activities that may result in changes in availability of digital resources, in ratings or scores (e.g., those of resources, hubs, members, and users 102a, 102b) and if applicable, in memberships to hubs. In one instance, the activity manager 108 receives a reference to a digital resource from a user 102a, 102b associated with a user device 110a, 110b. The activity manager 108 checks if the digital resource already exists in his hub(s) or the hub provider 104, subject to the submitter's privacy preference, which may be set in a user profile or at the time of submission. If the resource is considered as publicly available (e.g., having been introduced to the hub provider), such a submission may be counted as a positive user or member rating for the resource, and the submitter may be notified of other users (as well as their hubs) who have submitted the same resource publicly, or of hubs (e.g., those to which the submitter is member) that already have the resource available, subject to their privacy settings, if any. Wherever applicable, the submitter may be credited as having made available the resource to his hub(s) or the hub provider 104. According to one embodiment, original submissions themselves in relation to a hub or the hub provider 104 do not contribute to hub or overall ratings of their corresponding resources. The activity manager 108 may forward or otherwise distribute the newly submitted public resource to the submitter's hub(s) or hubs that accept public resources. According to some embodiments, the activity manager 108 comprises a module associated with the hub provider 104.

Figure 2:
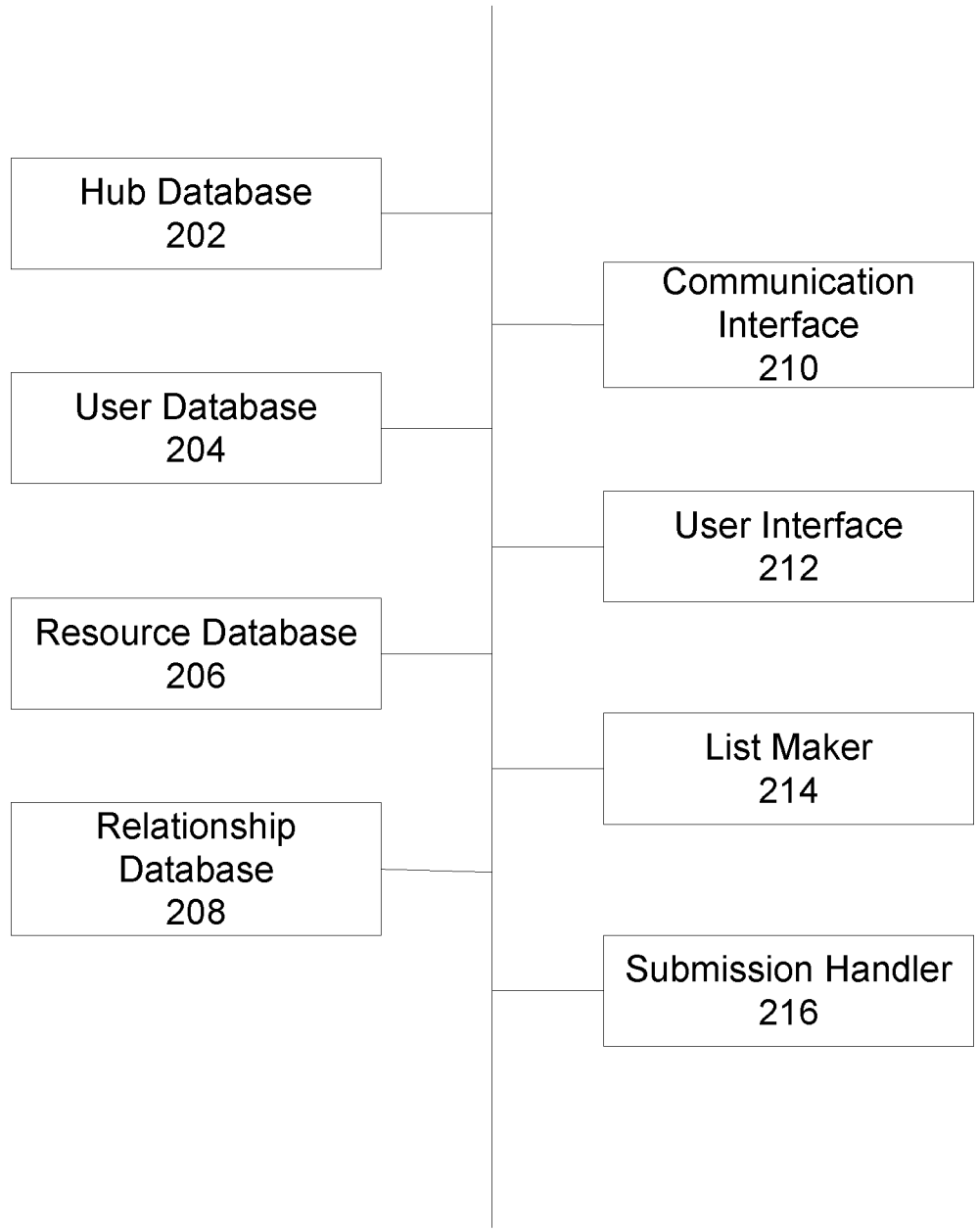
FIG. 2 shows a block diagram of an exemplary hub provider, such as the hub provider shown in FIG. 1.

FIG. 2 shows a block diagram of an exemplary hub provider 104, such as the hub provider 104 shown in FIG. 1. A hub database 202 is provided for storing data associated with each hub, such as membership rules, scores, ranks (e.g., those based on membership size and number of provider-wide prize resources originated), and resource import and export lists and constraints (e.g., hubs from and to which resources are received and forwarded respectively, and if a resource should be exported, and how many times an exportable resource originated from the hub may be forwarded by other hubs), and if public resources are to be received.

A user database 204 is provided for storing data associated with each user 102a, 102b (in a user account), such as his ranks (e.g., those based on numbers of hub-specific and provider-wide prize resources respectively), and user ID and password for the hub provider 104.

A resource database 206 is provided for storing resources and/or their references, as well as other related data such as their time of availability, overall rating or score, and local copy and reference.

A relationship database 208 is provided for storing data associated with relationships among hubs, users and resources, as well as their attributes such as popularity or scores. For example, it may store the membership relationship between a user 102a, 102b and one or more hubs, and a rating of his contribution for each hub (e.g., the number of prize resources that he submitted into the hub), and support query for the membership of a hub. It may store the availability relationship between a hub and one or more resources, and a rating for each resource in the hub, and support query for all hub-level ratings for each resource.

A communication interface 210 is provided for communicating with devices and users over a network 106, such as a user 102a, 102b via the user device 110a, 110b shown in FIG. 1. A device or a user 102a, 102b via a user device 110a, 110b may send and receive data (e.g., rating and resource submissions, hub membership requests and responses, and personal preferences) to and from the hub provider 104 via the communication interface 210. Any type of communications interface is within the scope of various embodiments.

A user interface 212 is provided for interacting with users or user devices 110a, 110b, and it includes the logic or procedures for user logon and logoff, presentation of hub-specific and provider-wide views having lists or selections of latest and prize resources, filtering and sorting of entities such as resources, hubs and the like, and hub creation and signup. Any layout, format, mode (e.g., audio), policy, scheme, or rules pertaining to presentation of resources and other entities such as hubs, users, relationships and the like are within the scope of various embodiments. The user interface 212 may also be equipped with a search engine or search module (not shown), or otherwise configured to provide indexing and searching services for entities such as resources, users, hubs, relationships and the like in the hub provider 104. Corresponding indexes, if any, may be stored and maintained in the databases for the entities of interest (e.g., the hub database 202, the user database 204, the resource database 206, and the relationship database 208), or some other databases.

A list maker 214 is provided for creating and maintaining lists or selections of latest resources and those of prize resources for the hub provider 104 and each hub therein. For instance, the relationship database 208 may provide the list maker 214 with the latest (and historical) aggregate ratings or popularity scores for a resource in a particular hub, so that the list maker 214 may create and maintain a list of prize resources at a given time for a hub. The resource database 206 may provide the list maker 214 with the latest (as well as historical) overall scores or popularity ranks for a resource.

A submission handler 216 is provided to process submissions from users 102a, 102b or user devices 110a, 110b, namely resources (or their references) and ratings against resources. According to one embodiment, the submitted resources (including their references) and ratings may be stored in the resource database 206 and the relationship database 208 respectively. Resource entries in the resource database 206 may include a timestamp indicating time and date of the submission, identification of the user 102a, 102b providing the submission (i.e., the submitter), his preference for whether to make the submission public (i.e., whether it be available to other hubs to which he is not a member), and the like. Rating entries in the relationship database 208 may include a timestamp of the submission, the submitter (or his ID), the hubs (or their IDs) to which the submitter is a member, and the like. These submissions and ratings (and other entities such as hubs, users, relationships, and the like) may be stored in a single or multiple databases, including the resource database 206, the user database 204, the resource database 206, the relationship database 208, and the like. One or more databases described herein may be located remotely and accessed by the hub provider 104 or any component, system or device coupled to the hub provider 104, subject to any applicable authentication control and access policy. A timestamp or other chronological information may be associated with each entry in these databases. The user interface 212 may feed or otherwise provide the submission handler 216 with resources and ratings from a user 102a, 102b or user device 110a, 110b. The submission handler 216 may include modules or functions for processing these resources and ratings, or act as a proxy or agent to a component, system or device comprising such components and functions, or a combination thereof. According to some embodiments, the submission handler 216 may be optional.

Figure 3:
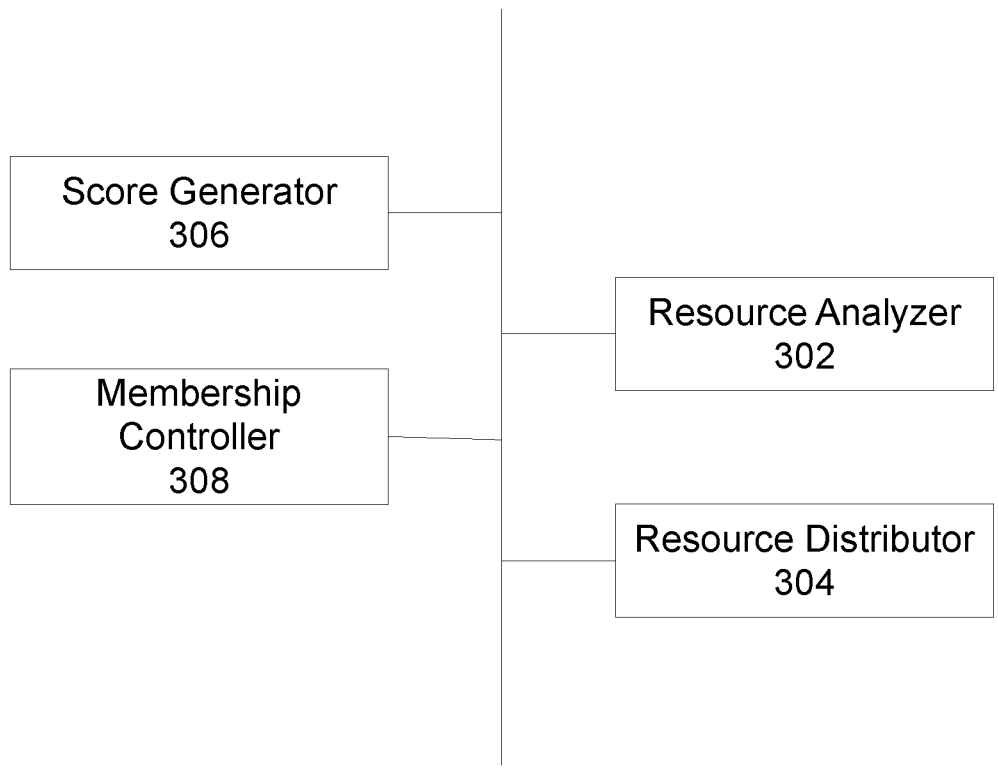
FIG. 3 shows a block diagram of an exemplary embodiment of the activity manager of FIG. 1.

The activity manager 108 shown in FIG. 1 is such an exemplary component, system and device. FIG. 3 shows a block diagram of an exemplary embodiment of the activity manager 108. The activity manager 108 comprises a resource analyzer 302, a resource distributor 304, a score generator 306, and a membership controller 308. According to some embodiments, the membership controller 308 may be optional.

The resource analyzer 302 determines if the submitted resource already exists in the provider hub (for instance, by checking the resource database 206). It may also create a local copy of the resource along with a new reference, store them in the resource database 206, and maintain the relationship between the copy and the original in the relationship database 208. In addition, multiple resources may be related to one another, for instance, for the purpose of popularity rating. For example, multiple linguistic translations or versions to the same news reporting, while having different URLs, may be regarded as referring to the same news item. On the other hand, resources having the same URL might be regarded as different resources, for example, when a newer and distinguishable version has been made available via the same URL, such as a newer version of software or a news front page with a newer publication date. The resource analyzer 302 creates a resource entry in the resource database 206 when the submitted resource is considered new. In an embodiment where submission of an existing resource (at the hub or provider level) is considered as a positive rating from a user 102a, 102b when he has not yet rated the resource, the resource analyzer 302 may create an internal rating submission for the resource, and the user 102a, 102b may then be considered as having rated it (at the hub or provider level, wherever applicable).

The resource distributor 304 identifies the hubs to which a submitted resource be made available based at least in part on hub membership of the submitter, and delivers the resource to the hub(s). Where an embodiment may support the creation and receipt of public resources, the resource distributor 304 determines whether the submitted resource should be made available to hubs which are configured or otherwise identified to accept public resources and to which the submitter is not a member. The submitter may provide a privacy setting that causes the resource be only made available to all his associated hubs (e.g., with membership), or some specific individual hubs or groups of hubs. Where an embodiment may support a private personal hub (i.e., to which no other users may have access except the user owner), the submitter may specify a privacy setting that causes the resource available to no hubs but his private personal hub. (A private personal hub, for example, may record all resources submitted and those rated positively by its owner, and highlight those being made prize at a hub or in the whole of the hub provider 104.) Such a privacy setting may be specified as part of a user account in the hub provider 104 (e.g., in the user database 204) and/or as part of a resource submission. The latter, if present, may override the former. The delivery of resources to their destination hubs may be realized via entries to the relationship database 208, where an entry relates or associates a destination hub in the hub database 202 to or with the resource in the resource database 206. The entry may comprise such a relationship, the date and time of association, the current and historical cumulative positive and negative ratings of the resource for the hub, and the like. The list maker 214 as shown in FIG. 2 would then be able to make it available to users of the hub via the user interface 212.

In some embodiments, the resource distributor 304 may be configured to attach or otherwise associate advertising to or with a resource destined to a hub. Examples of advertising include, but are not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like. In addition, the format of the advertising may include, singularly or in combination, an audio or animation or other multimedia element played at various times, banner advertising, network links, e-mail, images, text messages, video clips, audio clips, programs, applets, cookies, scripts, and the like. Furthermore, each instance, entity, or object of advertising itself may be regarded as a resource, and be maintained in the resource database 206 or some other databases. Its relationship with one or more resources (and/or with possibly other entities such as users, hubs, and the like) may be maintained in the relationship databases 208 or some other databases. The resource distributor 304 may deliver one or more advertising resources to a hub in response to a single resource submission (e.g., one carrying a primary resource). An advertising resource may also be rated by a user 102a, 102b and selected as a prize resource (e.g., by the list maker 214). It may be presented (e.g., by the user interface 212) to a user in a pop-up window on a user device 110a, 110b when a primary resource is chosen by a user 102a, 102b for view, or as part of the presentation of the primary resource. The user 102a, 102b may not only view the primary resource and its associated advertising resource(s), but also provide ratings against each of them. Any advertising presentation policy, scheme, or rules are within the scope of various embodiments.

The score generator 306 interprets, updates and maintains scores and the like (such as ratings, rankings, votes, marks, yes/no answers, like/dislike, bless/damn/forget, mark as favorite/hide it, clicks, impression time, and so on) that may be associated with resources and other entities, such as hubs, users, relationships, and the like. It may store the scores in a central database, or in various databases such as the relationship database 208, the resource database 206, the user database 204, and the hub database 202. Based at least in part on a rating submission (including internal rating submissions, if applicable), the score generator 306 may create or retrieve a database entry (e.g., from the relationship database 208) corresponding to the score for a resource at a hub, the hub having the submitter as member, and update the entry accordingly (e.g., the score and time of update). The score generator 306 may create or retrieve a database entry (e.g., from the resource database 206) corresponding to the hub provider-wide score for a resource, and update the entry accordingly. Score update or assignment may be executed in accordance to some policy or rules. For example, if a submitter is allowed to provide (only once) either a positive or negative rating against a resource, then one point may be added to the score of a resource for a positive rating, while one point may be removed from the score for a negative rating, with the score starting from zero when the resource is first made available in a hub. The hub provider-wide score for a resource may then be the sum of all its individual scores from all hubs. Alternatively, a good score and a bad score may be maintained simultaneously for a resource (at both hub-level and provider-wide-level), each accumulating points from positive and negative ratings respectively. According to one embodiment, the list maker 214 as shown in FIG. 2 may then produce a list of popular resources for a hub using only the good scores, and a list of controversial resources based at least in part on both the good and bad scores (both of which may be regarded as list of prize resources). Yet another scoring scheme may be to regard a resource as prize at the hub level when the percentage of a hub membership that have given it a positive rating is twice or more than the percentage that have given the resource a negative rating. And a resource may receive at the hub provider level one point for every ten positive ratings within a hub, with a minimum of 100 positive ratings within the hub, regardless of any negative ratings. A scoring rule may also be that there may only be one hub or a limited number of hubs receiving the one and only one rating (positive or otherwise) given by a user 102a, 102b against a resource even though the user 102a, 102b may be member to more than one hub (not counting his private personal hub, if any). The user 102a, 102b would need to designate a home hub or a hub priority list for the score generator 306 to decide which hub should receive the rating in relation to the resource. Another scoring rule may be that ratings from a hub administrator do not count in hub-specific scores for resources in relation to the hub. While the score generator 306 may be responsible for updating and maintaining scores for resources (and for other entities such as users, hubs, and so on) in the hub provider 104, the list maker 214 is responsible for selection of prize resources. A scoring policy or scheme may involve the collaboration of both the score generator 306 and the list maker 214. Any scoring policy, scheme, or rules are within the scope of various embodiments.

The membership controller 308 monitors scores and statuses of resources and users 102a, 102b (and other entities wherever applicable) that may affect hub memberships and performs appropriate actions accordingly. For instance, there may be a rule for a particular hub that stipulates a member be removed or changed to become an observer if he has not voted for or against a resource for a specific period of time (e.g., one month) despite being eligible to do so. Another example rule may be that a member be removed if none of his submitted resources is picked as prize for the hub for a specific period of time, or three or more of his submitted resources have ever received a certain number or percentage of negative ratings from the membership in a given period of time (e.g., over 70% of membership giving negative ratings within three months of the submission of each of his submitted resources). Any membership control policy, scheme, or rules are within the scope of various embodiments.

The membership controller 308 may check the relationship database 208 and other databases whenever there is a score, status and/or time change, or be notified of such changes (e.g., by the score generator 306, the resource distributor 304, and/or an internal or external timer (not shown)). The membership controller 308 may also set up a condition and associate it with each entity of interest (e.g., in the database where the entity resides) so that the score generator 306, resource distributor 304, resource analyzer 302 would check if the condition is met prior or subsequent to its own operations. The databases may also be configured to perform some or all of this condition checking upon access, and provide the necessary notification when needed. Upon notification of such conditions, the membership controller 308 may perform its operations accordingly (e.g., further rules checking and/or subsequent member removal). In one embodiment, the membership controller may notify users of their membership being removed from a hub via the user interface 212.

Any type of hub may be provided by the hub provider 104 shown in FIG. 1. A hub may comprise people or users established or grouped according to any type of category, such as friendship, geopolitical boundaries, affiliation (e.g., having the same email domain), and so forth. A user 102a, 102b may specify the hubs, the categories, subcategories, and so forth; and/or the hubs, the social networks, the categories, the subcategories, and so on may be predetermined by the hub provider 104. A user 102a, 102b may create a hub, join an existing hub, invite other people or users to join a hub, and cease to be a member of a hub, subject to the terms, rules and policies that may be set forth by the hub provider 104 and/or the hub owner. Such terms, rules and policies may include the provisions for hub creation, hub membership and resource submission and rating.

For instance, a user 102a, 102b may connect via a desktop computer or a portable device (i.e., a user device 110a, 110b shown in FIG. 1) to a website or system embodying the hub provider 104. The device 110a, 110b is communicatively coupled with the website, namely the hub provider, over a network 106 via the communication interface 210. The user 102a, 102b provides his email address as his user ID and a string of characters as his password as part of the signup process with the hub provider (via the user interface 212). Upon successful registration, the user interface 212 would create an entry (namely, a user account entry or simply a user entry) in the user database 204 for the user.

Figure 4:
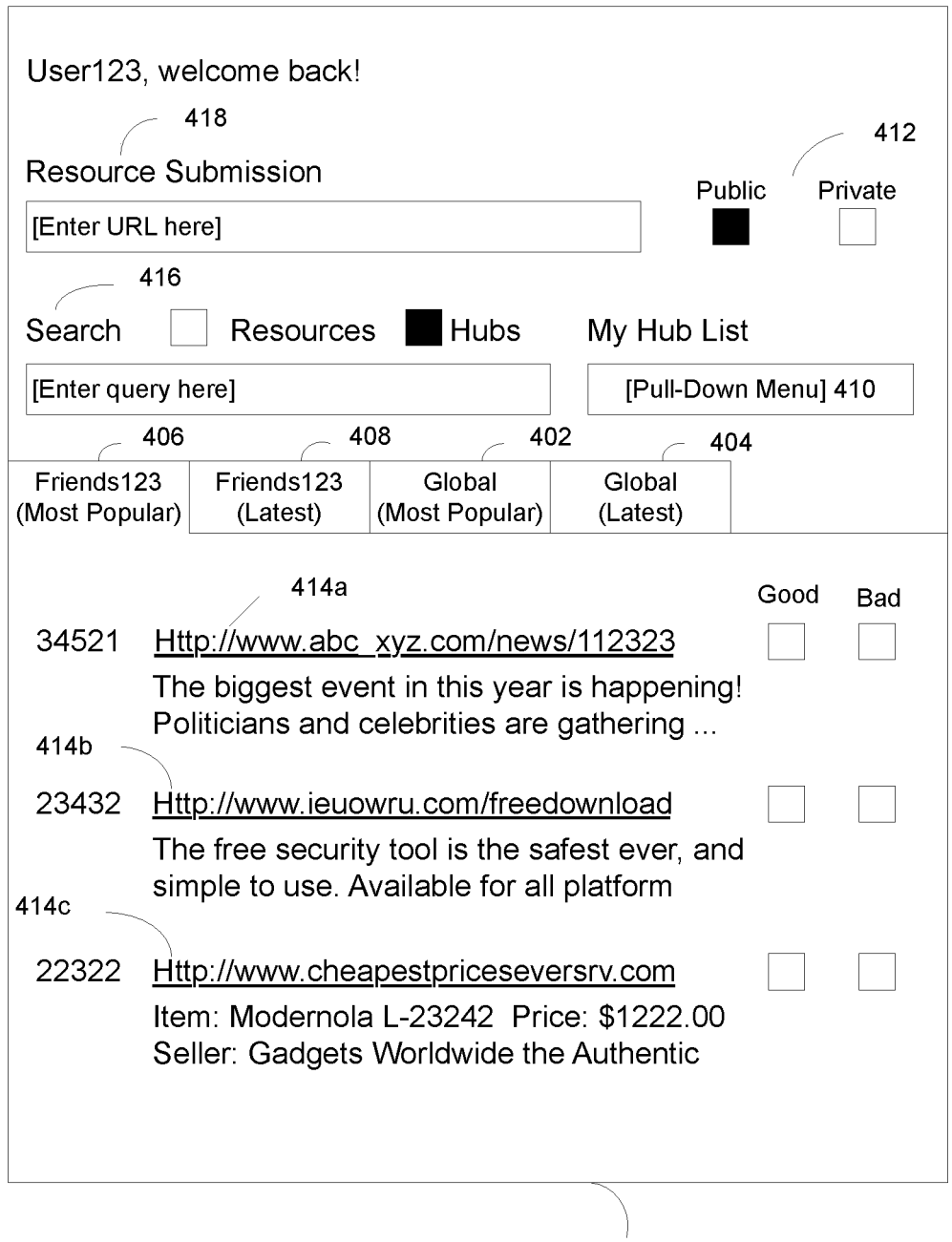
FIG. 4 shows an exemplary webpage that a user of the hub provider may be presented with upon successful logon.

FIG. 4 shows an exemplary webpage 400, which a user of the hub provider 104 may be presented with (by the user interface 212) upon successful logon. For instance, such an webpage may comprise a list or selection of provider-wide or global prize resources 402, a provider-wide or global view of latest resources 404, a pair of lists of hub-wide prize resources 406 and latest resources for a hub 408 (e.g., hub "Friends123"), a pull-down list 410 of hubs to which the user 102a, 102b is a member (from which a user 102a, 102b may select more hubs into view), a search interface 416 for resources and hubs in the hub provider 104, and a resource submission interface 418 which also allows a user 102a, 102b to specify if the resource should be made public 412. Each entry 414a, 414b, 414c, in the selection or list of resources may comprise a URL to the resource in question, a summary or excerpt for the resource, a hub-level and/or overall score, and a control for receiving a good or bad rating. An authenticated user 102a, 102b may locate a hub among a plurality of hubs retrieved via the search interface 416 (e.g., by school name, hobby description, organization name, a friend's name or user ID, and so on). The user 102a, 102b decides to sign up with the hub (herein named "ABC"), and is presented with membership criteria (e.g., a minimum age of 18 and a pending IQ test passed with a score of 80 or above) and agreements (e.g., initial membership of scout, but be demoted to observer if no prize resources submitted by the user within three months of membership). Such criteria and agreements may be stored and maintained in the hub database 202 or some other databases, which may also maintain other membership rules such as those for invitation, as well as rules about resources such as those for prize resource selection, public resource acceptance, resource import and export, and the like.

If the user 102a, 102b passes the criteria and accepts the agreements, then the user interface 212 may create a membership relationship between the user 102a, 102b and the hub in the relationship database 208, thereby realizing the adding of the user 102a, 102b as member to the hub. Otherwise, the signup process with the hub via the user interface 212 will be aborted, and the user 102a, 102b will be notified as such. Upon successful signup with the hub, the user's hub list will now include the hub. As such, the user 102a, 102b in this example may now view up to six non-private-personal lists: two for global latest and prize resources, two for hub Friends123's latest and prize resources, and two for hub ABC's. The list maker 214 retrieves the appropriate resources from the resource and relationship databases 208 and produces the respective lists.

Later the user 102a, 102b discovers a webpage of interest (e.g., via the same or different user device 110a, 110b), and submits the URL to the webpage to the hub provider 104 (e.g., via the resource submission interface 418 on the hub provider 104 website, or a resource submission interface 418 on a third-party tool or website, or one on the webpage of interest itself). The user interface 212 receives the resource submission via the communication interface 210, and passes it to the submission handler 216. (In some instances, the submission handler 216 may also receive the submission directly without involvement of the user interface 212.) The submission handler 216 invokes the resource analyzer 302, which checks if the resource already exists in the resource database 206. Assuming the resource already exists in the hub provider as a whole but not in hubs Friends123 and ABC, the resource distributor 304 will create a positive availability relationship between the resource (e.g., via its URL in the resource database 206) and each of the two hubs in the relationship database 208. Subsequently, other members of these two hubs may see the resource or a copy or excerpt of the resource along with its URL on the hubs' lists or selections of latest resources, which are updated by the list maker 214. The submitter member or other members may add comments to the resource. These comments may be stored and maintained in the relationship database 208 or other databases, and made available for view to all members of the same hub. According to some embodiments, members of other hubs which happen to have already included the resource in their latest and/or prize resource lists may also view these comments if both parties agree to export and import comments respectively in relation to a common resource.

As other members of hub ABC provide their ratings against the resource, the score generator 306 is updating the hub as well as overall (i.e., provider-wide) scores for the resource in the relationship database 208 or the databases where the scores are kept. The popularity of the resource in hub ABC may soon promote the resource to become a global (i.e., provider-wide) prize resource (as determined by the list maker 214) when it has so far been unable to attain such a status despite being available to many other hubs for quite a while. The resource may have also received little attention in hub Friends123.

The same user 102a, 102b in this example may join another hub (herein named "XYZ"), with the same membership criteria and agreements as hub ABC (e.g., membership status changed from scout to observer if no prize resource submissions within three months of membership). Later when the user 102a, 102b fails to meet the criteria or fulfill the agreements (as determined by the membership controller 308), the membership of the user 102a, 102b in the hub XYZ will be removed (e.g., as executed by the membership controller 308 via the removal of the corresponding membership relationship entry in the relationship database 208). The user interface 212 may also notify the user 102a, 102b of such membership removal.

According to some embodiments, one or more hubs may be provided for each user 102a, 102b in a hub provider 104. For example, a user 102a, 102b may have a hub comprised of membership established or otherwise grouped according to university attended, to the user's residence or geographical position (e.g., via location sensing modules or devices), to the user's professional status or position, to a business or organization, and so forth. In one embodiment, a common or global hub may establish or otherwise group all users 102a, 102b in a hub provider 104.

Although the hub provider 104 is described as being comprised of various components (the hub database 202, the user database 204, the resource database 206, the relationship database 208, the communication interface 210, the user interface 212, the list maker 214, and the submission handler 216), fewer or more components may comprise the hub provider 104 shown in FIG. 1 and still fall within the scope of various embodiments. Likewise, fewer or more components than those shown in FIG. 3 may comprise the activity manager 108 shown in FIG. 1 and still fall within the scope of various embodiments.

Figure 5:
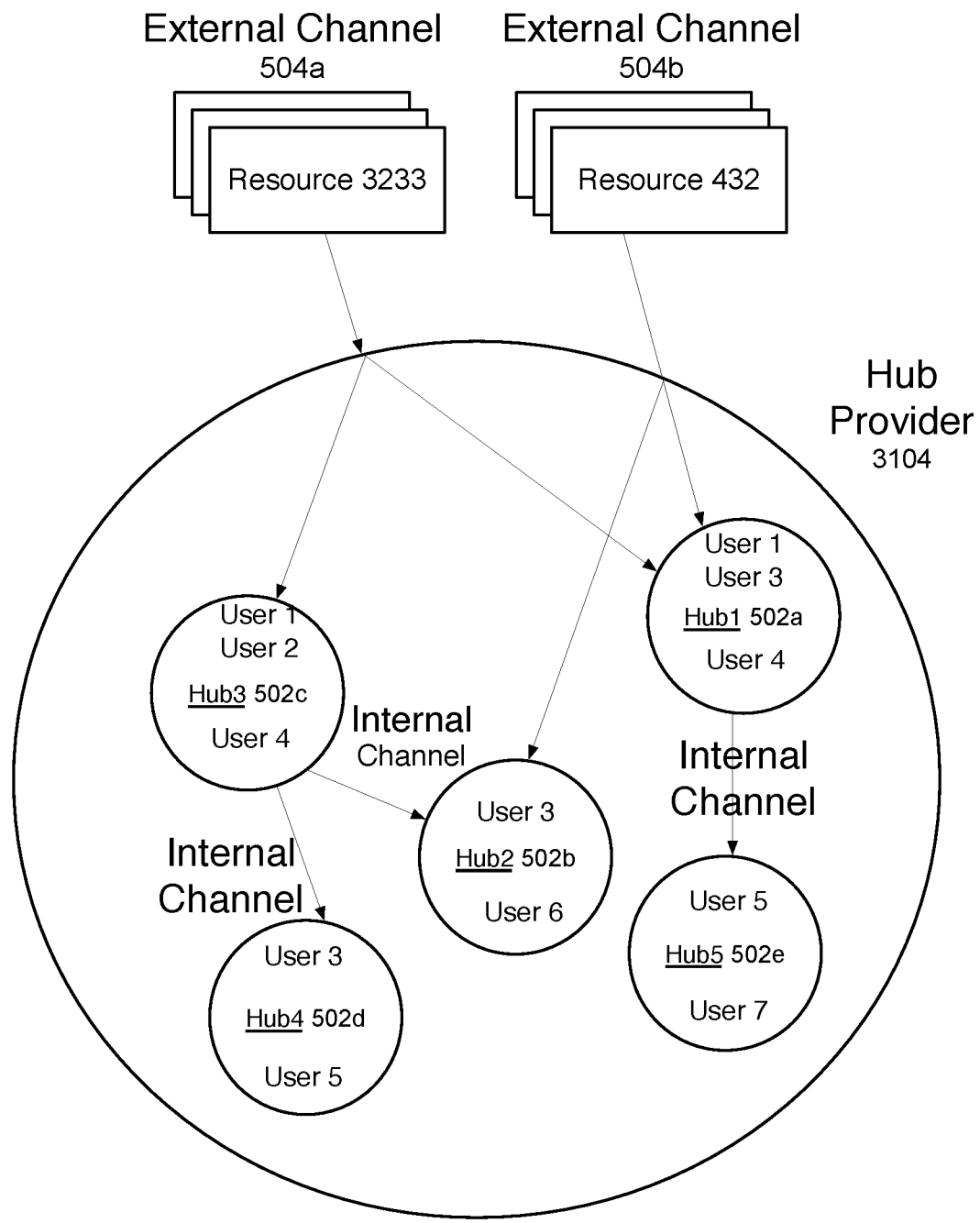
FIG. 5 shows a representation of a hub provider, and a hub-level prize resource list for five hubs, as well as the provider-wide prize resource list 506.

FIG. 5 shows a representation of a hub provider such as the hub provider 104 in FIG. 1, and a hub-level prize resource list for five hubs 502a, 502b, 502c, 502d, 502e, as well as the provider-wide prize resource list 506. There are two external channels of resources 504a, 504b that hubs in the hub provider may subscribe to or otherwise obtain resources from. These two channels 504a, 504b have Resource 3233 and Resource 432 respectively. Hub1 502a and Hub3 502c receive resources from the former channel while Hub1 502a and Hub2 502b receive resources from the latter channel. Hubs may also subscribe to or otherwise obtain resources from other hubs. For example, Hub2 502b and Hub4 502d receive resources from Hub3 502c, while Hub5 502e receives resources from Hub1 502a. Hub1 502a and Hub3 502c are referred to as internal channels. A user may belong to more than one hub. For example, User1 belongs to Hub1 502a and Hub3 502c, while User3 belongs to Hub1 502a, Hub2 502b, and Hub4 502d. According to one embodiment, a hub may specify criteria for selecting incoming resources from an external or internal channel. For example, a hub may only import prize resources from another hub. According to another embodiment, a hub may perform export control on its resources, whether created internally, or imported from external or internal channels. For example, a hub may make available only a subset of resources to other hubs for subscription, while restricting other resources for internal consumption only. The former may be referred to as public resources, while the latter as private resources with respect to the hub. All members of the hub may designate individual resources as private or public, or only those with certain privileges such as the hub owner or administrator may make resources public.

Figure 6:
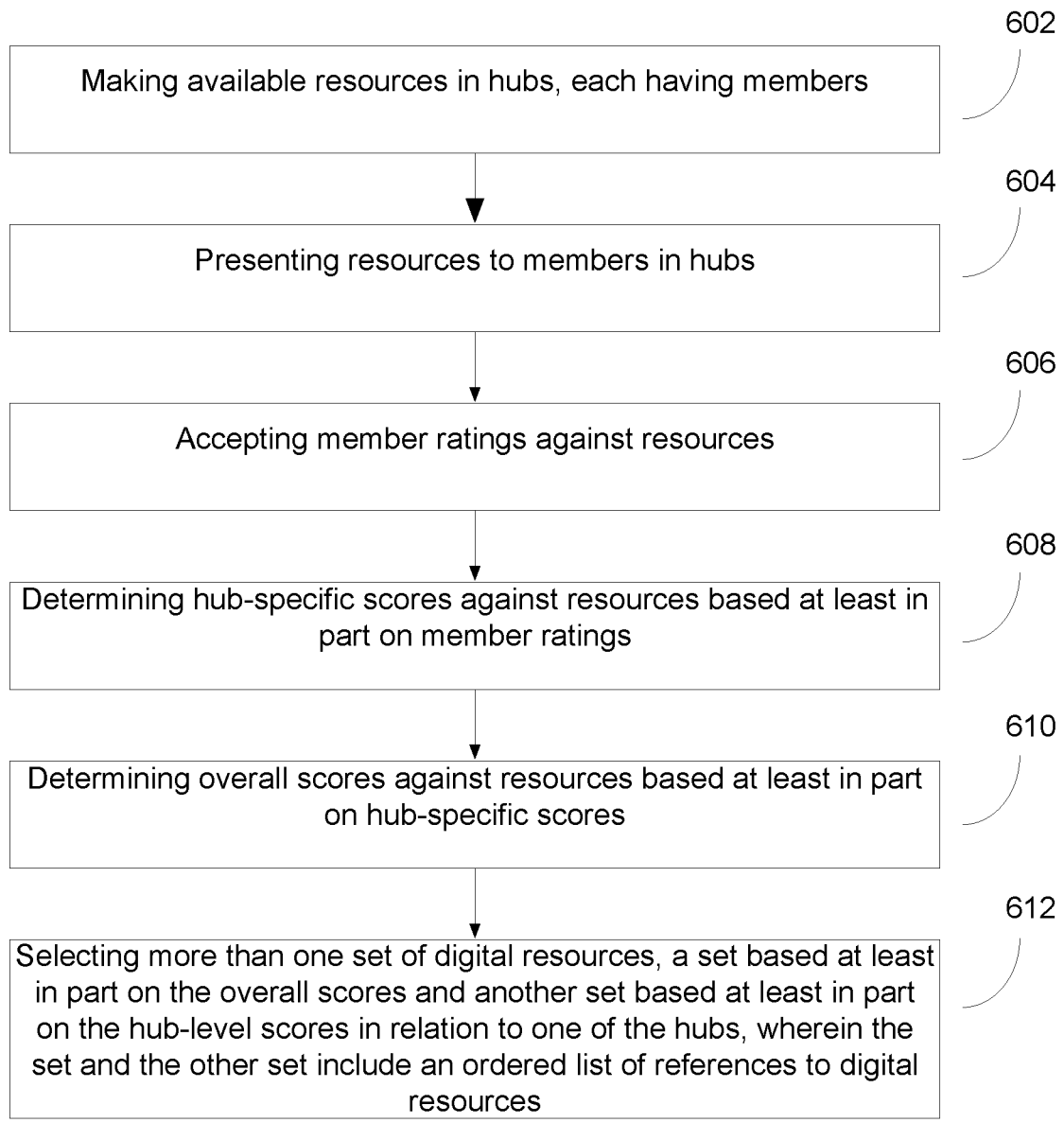
FIG. 6 shows a flow diagram of an exemplary process for selecting more than one set of digital resources among a plurality of resources via a hub provider.

FIG. 6 shows a flow diagram of an exemplary process for selecting more than one set of digital resources among a plurality of resources via a hub provider 104. For instance, a user 102a, 102b via a user device 110, 110b such as one shown in FIG. 1 may make available 602 one or more resources to a hub provider by sending or submitting their references (e.g., URLs) over a network 106. The hub provider 104 may comprise a plurality of hubs each having members, where the user 102a, 102b may be member to one or more of the hubs, subject to membership criteria and agreements, and other applicable constraints. The submitting may include sending a user ID (and password if not yet authenticated as a user 102a, 102b of the hub provider 104), and other information, such as comment or some initial rating.

The hub provider 104 may then make available the resource (and/or its representative reference, copy, or other equivalent entities or objects) to all the members of the hubs to which the resource is destined 604, e.g., by the membership of the user 102a, 102b in the hubs, the policy in public resource acceptance of the other hubs, and the like. For example, the user interface 212 of the hub provider 104, upon receipt of the submission, may pass it to the submission handler 216 which invokes the resource analyzer 302. The resource analyzer 302 may determine that the resource is not yet available to the hubs to which the user 102a, 102b is member, so it adds the resource to the hubs via positive resource availability entries in the relationship database 208. The list maker 214 may then make the resource available on the list of latest resources for each of the hub.

The hub provider 104 may accept ratings from members whose hubs have the resource in question available 606, and determine a hub-level or hub-specific score against the resource for each of the hubs 608, based at least in part on these member ratings. For example, the user interface 212 may receive a rating submission from a user 102a, 102b or user device 110a, 110b via the communication interface 210. The user interface 212 then passes it to the submission handler 216 which invokes the score generator 306. The score generator 306 may update the score for the relationships between the resource and each of the applicable hubs in the relationship database 208.

The hub provider 104 may also determine an overall score 610 against the resource based at least in part on its hub-level or hub-specific scores. Such overall scores associated with resources in the hub provider 104 may drive, enable or otherwise facilitate the hub provider 104 to select more than one set of prize digital resources 612, the more than one set of prize digital resources comprising a set based at least in part on the overall scores, and another set based at least in part on the hub-level scores in relation one of the hubs in the hub provider 104, wherein the set and the other set include an ordered list of references to digital resources, the references comprising URLs each accompanied by a score, the score being an overall score or a hub-level score. For example, the score generator 306 may calculate and maintain an overall score (e.g., in the resource database 206) for each of the resources in the hub provider 104, in addition to updating their hub-level scores. The list maker 214 may identify global prize resources 402 based at least in part on these overall scores, and produce a selection or list of global prize resources 402 accessible (e.g., via the user interface 212) to all members of the hub provider 104. Generation or production of such a selection or list may take place continuously, on-demand, periodically, or from time to time.

Similar to prize resources, a prize member may be determined at the hub level, for instance, based at least in part on his contribution to making available prize resources to the hub in question, and a prize user 102a, 102b based at least in part on the hub-level scores the resources that he has made available to the hub provider 104 have received. (In an embodiment, a user may receive points towards his obtaining a prize status for resources he has made public that other hubs, i.e., those to which he is not a member at the time of submission, have then considered as prize.) A prize hub may be determined, for instance, based at least in part on the number or percentage of provider-wide prize resources made available by the hub in question over a given period of time, or based on the number or percentage of hubs per some category whose prize lists have included resources that originated from the hub.

A plurality of embodiments are specifically illustrated and/or described herein. However, it will be appreciated that modifications and variations are covered by the above teachings and within the scope of the present invention without departing from the spirit and intended scope thereof. For example, a hub provider 104 may provide a set of rules or rule templates for various aspects of a hub-related maintenance and operations, such as those for membership admission, invitation and removal, and those for resource submission and (hub-specific) resource rating and list making. A hub owner or authority (e.g., the creator of the hub, one or more members elected by others in the hub, and so on) may choose among these rules or rule templates to form a specific membership policy for the hub. Rules or rule templates for changing existing rules may also be provided by the hub provider 104. A hub may also be associated with an external or third-party component or system for conducting membership admission testing, such as an IQ test. The user interface 212 may be configured to invoke such a component or system upon a user request for membership to a specific hub, cause the user 102a, 102b or the user device 110a, 110b to interact with the component or system, and then receive the testing result from the component or system. The user interface 212 may also monitor how a user interacts or otherwise selects resources in the hub provider 104 to generate (internal) rating submissions. A user 102a, 102b may also send the hub provider 104 via a user device 110a, 110b a single submission comprising more than one resource and/or rating. The user interface 212 may provide a search interface 416 whereby a user may perform personalized queries against the resources in the hub provider 104. For example, he may enter queries comprising keywords against only the resources he has submitted or rated positively. A user 102a, 102b or a hub authority may also specify criteria for filtering and sorting resources available to him or the hub. For example, a user 102a, 102b may hide a resource from his personal view either for his own private personal hub or another hub. Such a request and another subsequent change may cause the user interface 212 to generate a rating submission against the resource, e.g., for the calculation of the overall score for the resource in question. A hub provider 104 embodying the present invention may provide hubs in a specific category, including but not limited to advertising, retail goods and services, or news and journalism. A hub provider 104 may also specify various categories of hubs (e.g., lifestyle, politics, science and technology, literature, and the like), where a user 102a, 102b may create a new category. A hub provider 104 may stipulate that a user 102a, 102b may only join one hub per category, or become a voting or rating member to one hub (per category or per hub provider 104) while being allowed to be observer to all other hubs. A hub provider 104 may detect or determine hubs common in interest and thereby suggest merging of these hubs. Users may also be recommended for membership to hubs or review of resources based on his interests that may be deduced or induced from his memberships with other hubs, his resource and rating submissions, or some other observations or testing, including but not limited to questionnaires and personality profiling. The hub provider 104 may also identify and publicly recognize a user 102a, 102b or hub for his or its ability to discover prize resources, and award or otherwise assign a title or rank to the user 102a, 102b or the hub. Ratings or scores of such a prize user or prize hub may receive more weight than other non-prize users or hubs for hub-level or overall score generation. In embodiments, a user in a hub provider may not need to join or belong to any hub. He or she may be presented with a list of provider-wide prize resources.

A hub provider 104 may comprise a plurality of hub providers 104. For example, a system or website may be a hub provider 104 for a number of news publishers each being a hub provider 104 for its subscribers, who may join or create hubs of their interest. A hub may also comprise a plurality of hubs. For example, a hub may refer to a country and have state or province hubs, each further comprising city or town hubs. Ratings or scores may be amalgamated or consolidated for each higher level (e.g., by the summation of lower-level scores or some other schemes) for entities or objects of interest, such as resources, hubs, users and the like. A system or service may be equipped or otherwise embodying the features of the present invention in addition to its inherent functionality. For example, a search service or engine may initially partition or assign its users 102a, 102b into different geographical areas or locations each area or location being a hub, and allow them to join other hubs (of types other than geographical area or location, e.g., shopping, health, entertainment, travel, and so on). The users may join and quit any of these hubs freely in relation to their queries. The search engine may monitor or track resources selected by the users from search results, and the queries responsible for the search results. The user-selected resources may be considered as having better ratings than those not selected from the search results. Each resource may then be associated with a relevancy score for the hub(s) in question, while having a global relevancy score. In response to queries, the search engine may present the users with search results comprising groups of relevant resources or their references, one group corresponding to their overall relevancy scores, while each of the others corresponding to a specific hub. Relevant resources in more than one hub of interest (e.g., geographical location hub "Seattle" and context hub "Travel") may further be consolidated to produce a selection or list of resources based on their consolidated hub-level scores. For example, a logical hub of "Travel from Seattle" may be created (e.g., on the fly in response to queries from users having membership in both "Travel" and "Seattle") to account for resources that are applicable to both hub "Travel" and hub "Seattle", and assume their consolidated hub-level score (e.g., by summation of their individual hub-level scores, or some other schemes). A social networking website or system, or an application on the website or system, may provide its members with the provision to create hubs based on friendship, topic, organization or professional affiliation, brand, and so on. A peer-to-peer resource sharing website or system may allow its users to share music, videos or retail offers among groups or circles of friends or people, each group or circle being a hub. A member may share the availability of a song, video or retail offer with his peers in the group or circle, and provide indication or action interpretable as a rating, such as its being his favorite, a good deal, a purchase, a watched video, and so on. Some action or indication may result in a higher rating than another, e.g., a purchase resulting in a higher rating than being a favorite.

In addition to selections or lists of latest, prize, or controversial resources, a hub provider 104 or individual hubs in a hub provider 104 may include other types of selections or lists. For example, a list of pending prize resources may include resources that have attained some intermediary level of scores, so that users 102*a*, 102*b* or members may be led or otherwise suggested to view or review such pending prize resources so to obtain better consensus or more ratings on their way to being included in a prize selection or list. According to some embodiments, a hub provider 104 could determine a resource that has a high negative score in one hub while a high positive score in another hub to be a prize resource for the latter hub and not the former, and yet consider both scores as a positive contribution to the overall score of the resource, for example, for a list of controversial resources.

Furthermore, a hub provider 104 may also be equipped with facilities or components to allow users to generate their own digital resources, which may be derived from resources submitted from other users. For example, a user may create a resource comprising an incoming resource, and his editorial or opinion about that resource. A digital resource may also be specific to a certain type of resources and be created in accordance to some templates or guidelines. For example, an offer of goods and services may include an item name, seller information, price, and optional quantity. Membership to hubs or delivery of resources may require payment. A hub provider 104 may be equipped with a component or otherwise configured to trigger a component or system to handle such payment. A submitter may also receive payments for resource submissions whose resources or their related or associated ads that have received a certain level of attention, e.g., becoming a prize resource. For example, an online newspaper may register as or otherwise become a hub, with subscribers as members and other content distributors/aggregators being hubs that receive news items from the online newspaper. Resource usage (e.g., impressions, clicks, transactions, and the like) may also be metered, e.g., for payment or revenue. A portion of such revenue may be distributed to users responsible for submitting or otherwise making available those resources.

Moreover, a resource may be a composite, comprising a plurality of resources, including resources of different categories or sources, e.g., ads on a new article, or still photos in a video, and so on. A reference to a resource may involve different scopes, e.g., a URL may refer to a single webpage or a website including all URLs comprising the URL. A resource submission may include annotations, tags and other information to qualify or otherwise annotate the resource, such as whether the URL refers to a webpage or a website, the topic to which the resource is relevant to, a summary of item, seller, quantity, and price to an offer, and so on. A reference to a resource needs not be explicitly available or accessible online to a user 102*a*, 102*b*. For instance, a brick-and-mortar retail offer comprising an item name, seller information and price may be presented or otherwise accessible via a list of offers, where a user 102*a*, 102*b* may choose one among the list, where the hub provider 104 would maintain internal references to such offers. Answers from a user 102*a*, 102*b* to a series of questions may also help determine a resource without revealing the resulting resource(s), e.g., a personality profile or characterization, to the user 102*a*, 102*b*. How the chosen or resulting resources correspond to one another may be established or otherwise determined by the hub provider 104.

Note that a hub or a group may comprise one or more devices instead of, for instance, individual users, and a resource to be rated or assessed may represent a service or a quality of service, such as download speeds of an internet connection. For instance, in a multi-access point Wi-Fi network, wireless devices or clients associated with an access point in the network may be regarded as a group or belonging to a group or hub. Each group or hub may be associated with a score or rating, such as an average download speed over a period of time across the associated clients, that indicates the quality of the connection. An overall score or rating for the Wi-Fi network may be calculated or otherwise derived from these individual scores or ratings associated with the Wi-Fi access points in the network.

Disclosed also are methods, systems, and apparatuses for selecting a product among a plurality of products. For instance, a user may make a payment in exchange for trying, using, or possessing more than one product (e.g., an e-book) in a set or collection, and only to keep one from among the available products in the set or collection later. For example, a system such as an online marketplace may group three e-books in a collection, and present them to a user. The system enables the user to download or otherwise access all three e-books upon receiving a payment from him. Within a predefined or agreed-upon period of time, the user may select which e-book to keep, with the other e-books becoming unavailable or inaccessible, being removed from devices associated with the user, or becoming unlicensed. In one embodiment, should the user fail to make the selection within such a timeframe, the system may choose one for the user, for example, based on a default setting, randomly, or based on the most popular selection near the time of selection expiry. In another embodiment, a user may rate or vote for a selection, where all users participating the rating or voting would receive the same selection based on the outcome of the rating or voting. In another embodiment, the available selections in a set or collection may be provided by different retailers, seller, or providers. In one embodiment, a retailer, seller or provider whose product is not selected still receive a part of the revenue generated from a selected product from another retailer, seller or provider. In another embodiment, a plurality of users may pledge or commit a sum for a project, endeavor or business enterprise involving more than one contender, without any contender being first selected to undertake the project, endeavor or business enterprise. Upon given an access to a product or presentation from one or more contenders (e.g., a prototype related to the project of interest). these users or a subset of these users would then rate or vote in relation to the available contenders. As a result, a contender would be selected to undertake the project, endeavor or business enterprise based on the results of this rating or voting, and the contender would receive the money pledged or committed, or a portion thereof.

Disclosed also are methods, systems, and devices for restricting access to one or more apps on a device. For instance, a method for restricting access to one or more apps and their data is described, the method comprising providing an area; accepting a request to associate one or more functions with the area; associating the one or more functions with the area; accepting a request for access to the area; requesting for authentication; providing access to the one or more functions, if the authentication is successful; and denying access to the one or more functions, if the authentication is not successful. According to another embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

Figure 7:
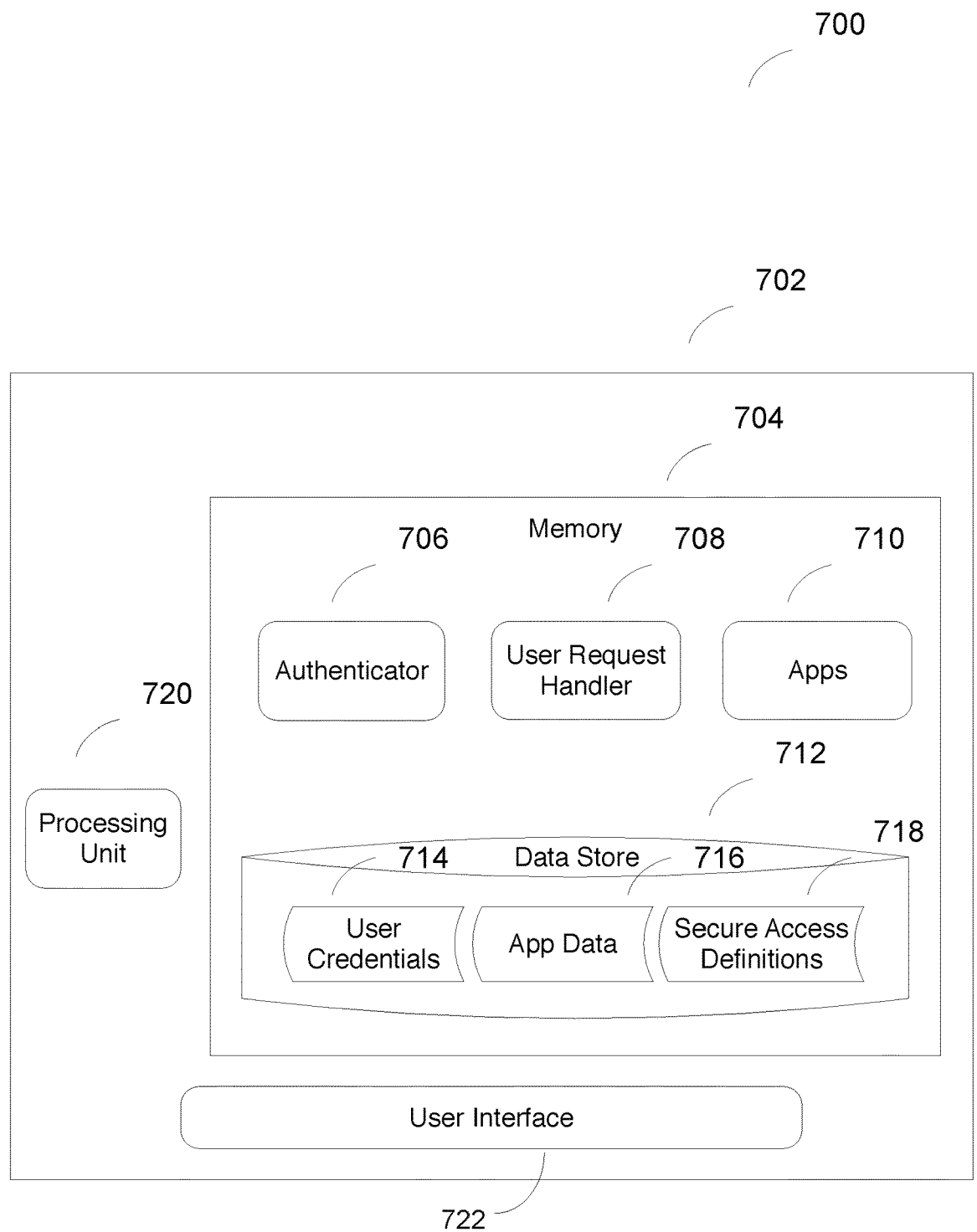
FIG. 7 shows a block diagram of a device in accordance with an embodiment.

FIG. 7 shows a block diagram 700 of an exemplary device 702 equipped with the present invention. The device 702 comprises a processing unit 720, a memory 704, and a user interface 722. The device 702 (e.g., a mobile phone, personal digital assistant, computing tablet, desktop phone, a portable or desktop computer, a control terminal, and so on) is communicatively coupled to a user via the user interface 722 (e.g., a display, a speaker, a microphone, a keyboard, a touch screen, and so on). Any type of user interface is within the scope of various embodiments.

The user interface 722 is provided for interacting with a user, including receiving requests for designating an app for restricted access and accessing the app or a restricted area, view or screen in or with which the app is protected or associated, as well as indications that another user or a device of another user may access applications or services on the device.

The memory 704 is provided for storing programs and data for the operation of the device 702. It includes an authenticator 706, a user request handler 708, one or more apps 710, and a data store 712, the data store comprising user credentials 714, app data 706, and secure access definitions 718. The user request handler 708 is responsible for interpreting requests sent by a user via the user interface 722, such as associating apps with a secure or restricted area, assigning apps to a secure or restricted area, view or screen, deciding if authentication is required in relation to accessing the secure or restricted area so to run or make visible the one or more apps and their data installed or otherwise accessible through the device, and communicating with the one or more apps 710 about requests from one or more users, the requests for granting access to the one or more apps 710 on the device 702 to one or more devices associated with the one or more users. The authenticator 706 is responsible for prompting for and accepting input from the user, for example, to decide if a secure area comprising the apps in question should be made visible or available to the user, as well as other authentication-related activities, such as creating or changing user credentials. If the authentication is successful, the authenticator may then allow the requested operation or effect to proceed. Otherwise, the user is notified of such denial. The user credentials 714 in the data store 712 are used for such authentication purpose (e.g., as executed by the authenticator 706), while the secure access definitions 718 there provides the rules or boundaries under which an authentication is required. The app data 716 provides data storage for the one or more apps 710. The authenticator 706 may also facilitate identification and/or authentication of an external device or an application on an external device based on identification and/or authentication of the user of the application or the external device.

The processing unit 720 is provided for executing the programs (e.g., the authenticator 706, user request handler 708, and apps 710) in the memory 704, and the user interface 712 for interacting with a user.

In some embodiments, the secure access definitions 718 may be part of the user request handler 708, or the authenticator 706 may be part of the user request handler 708. As such, although the device 702 is described as being comprised of these various components, fewer or more components may comprise the device shown in FIG. 7, and still fall within the scope of various embodiments.

In one embodiment, a user via the user interface 722 selects an app for configuration (e.g., by touching and holding for a pre-determined period of time an icon for the app on a touch screen), and specifies that the app be associated with a secure area, such as a folder, a screen view or page, or a virtual screen available on the device. (E.g., the user may gesture to the device via screen scrolling that he wants to access to the next screen view or page to the right of the current screen view or page, or an out-of-sight virtual screen positioned virtually at the top of the current screen, the next screen view or page, or the out-of-sight virtual screen being designated or configured as a secure area.)

Such specification or association may be performed via a configuration file, settings page, or the selected icon (e.g., dragging the icon to the secure area). The user request handler 708 or its equivalent stores this configuration in the secure access definitions 718. If the user does not yet have credentials established for such authentication, then the user request handler 708 causes the authenticator 706 to prompt the user to establish one, and to handle the subsequent interaction with the user. Alternatively, the user request handler 708 may do so with the user via the user interface 712. Successfully established, the credentials are stored in the user credentials 714 in the data store 712. The user may also change the credentials via the authenticator 706 independent of any app invocation or configuration for access. If the user wishes to no longer restrict access to the app, then he may be first authenticated by the authenticator 706 before being granted the permission to make such change. (E.g., to disassociate an app with a secure area, the user may touch, hold, and drag the icon for the app in the secure area to outside.) The user request handler 708 updates the secure access definitions 718 accordingly.

Upon receiving a request from a user to access an area or screen through the user interface 712, the user request handler 708 checks if there is any applicable data in the secure access definitions 718 for the area or screen. If so, it causes the authenticator 706 to interact with the user and authenticate him against the data in the user credentials 714 in the data store 712. Otherwise, the area or screen may be accessible without further permission or credentials checking. Should the authentication in the former case be successful, the area or screen may be accessible, thereby making the apps therein available to the user.

In an embodiment, a touch-screen device presents a list, view or inventory of available apps on one or more visual pages or areas, where a user may go from one page or area to another. For example, a so-called home screen on the device may comprise more than one set of apps, where each set of apps is displayed or otherwise presented independently from the other sets. The user may gesture to the device (e.g., by swiping across the screen) to select the previous or next set or sets in relation to the current set of apps. Each set of apps so display or presented makes up a view, each of which may extend beyond what the physical screen of the device can show at any one point in time. For example, individual views may be organized horizontally while the icons of the apps vertically. Animations such as that of sliding from one page to the previous or next, either horizontally or vertically, may accompany this change of view. In addition, a secure area may change in size and/or color, for example, depending on the status of protection and the number of apps therein. The user interface 712 is responsible for such interaction with the user.

In one instance, the user indicates via the user interface 712 to the user request handler 708 that one view is configured to become a restricted area, in that access to it would require authentication of the user by the authenticator 706. Upon successful authentication, the user may access this restricted area or view, and assign apps to it (e.g., by moving their icons into the area or view), thereby removing these apps from authentication-free access at the app execution level even when the device-level authentication, if any, has been successfully performed or otherwise been disabled. That is, to gain access to apps with restricted access, the user needs to be authenticated by the authenticator 706. Successful authentication enables the user to access all apps in the restricted view or area for which the authentication is performed. Such authentication may be required every time access to the restricted area or view, or to the individual apps within it, is requested by the user, or when there is some inactivity of the device or apps in question since the last successful authentication. Or the user may open and close restricted areas or views manually via the user interface 712, so that the user request handler 708 may then decide in accordance to this manual setting if access to the restricted areas is granted and whether authentication is needed.

The user may also designate two or more sections of views, one or more of which comprising one or more restricted areas or views. Between any two sections may be a demarcation or partition point, line or interface (visible or otherwise), where authentication will be required if the user requests access to a section of restricted areas or views, and not required if he requests access to a section of non-restricted areas or views. Different sections of restricted areas or views may have different passwords or credentials for authentication. In addition, the same app with different data sets may also appear in different sections. For example, a phone app may appear in both the non-restricted and restricted areas, where the phone app in the restricted area has access to different contact data and call logs compared to the one in the non-restricted area. Another example app is a photo album app. That is, the data that an app may have access to defines the function of the app and distinguish it from the otherwise same app that does not have access to the data (but perhaps to other data). In one embodiment, a Secure Access Definition such as the one shown in FIG. 7 stores and maintains the relationships between the apps and their respective data in relation to the sections that they are applicable to. For instance, the user may specify an email address for which messages received will be associated with an email app in a section of restricted areas, while messages received for all other email addresses will be associated with an email app in another section.

Figure 8:
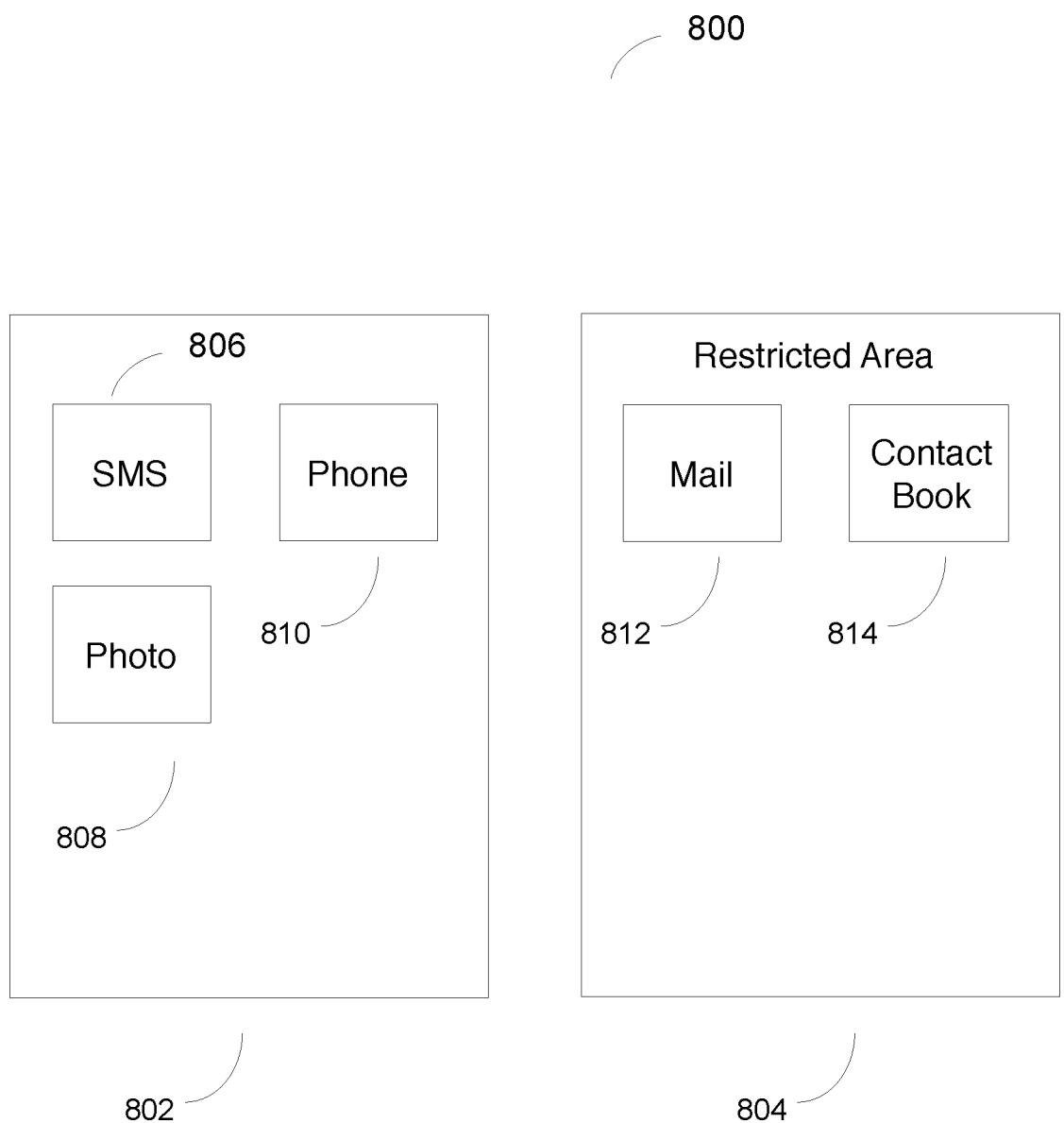
FIG. 8 shows screenshots on a device in accordance with an embodiment.

FIG. 8 shows an exemplary display 800 of screen that may be presented on a device embodying the one depicted in FIG. 7. There are two screen shots 802, 804, each representing an area or view of apps or their icons. The one on the right is a restricted area whereas the on the left is not. As such, the left screen, area or view will be accessible to the user without the need for authentication, while the data associated with the apps whose icons appearing in this screen, area, or view (i.e., SMS 806, Phone 810, and Photo 808) are available to the user also without any authentication. On the other hand, since the right screen, area, or view is restricted, a user will not gain access or visibility to it until successful authentication. As such, the apps (i.e., Mail 812 and Contact Book 814) in this screen, area, or view will be protected from unauthorized access. The data associated with these apps are likewise unavailable to the user or other apps that the user may be using or capable of invoking without authentication.

Figure 9:
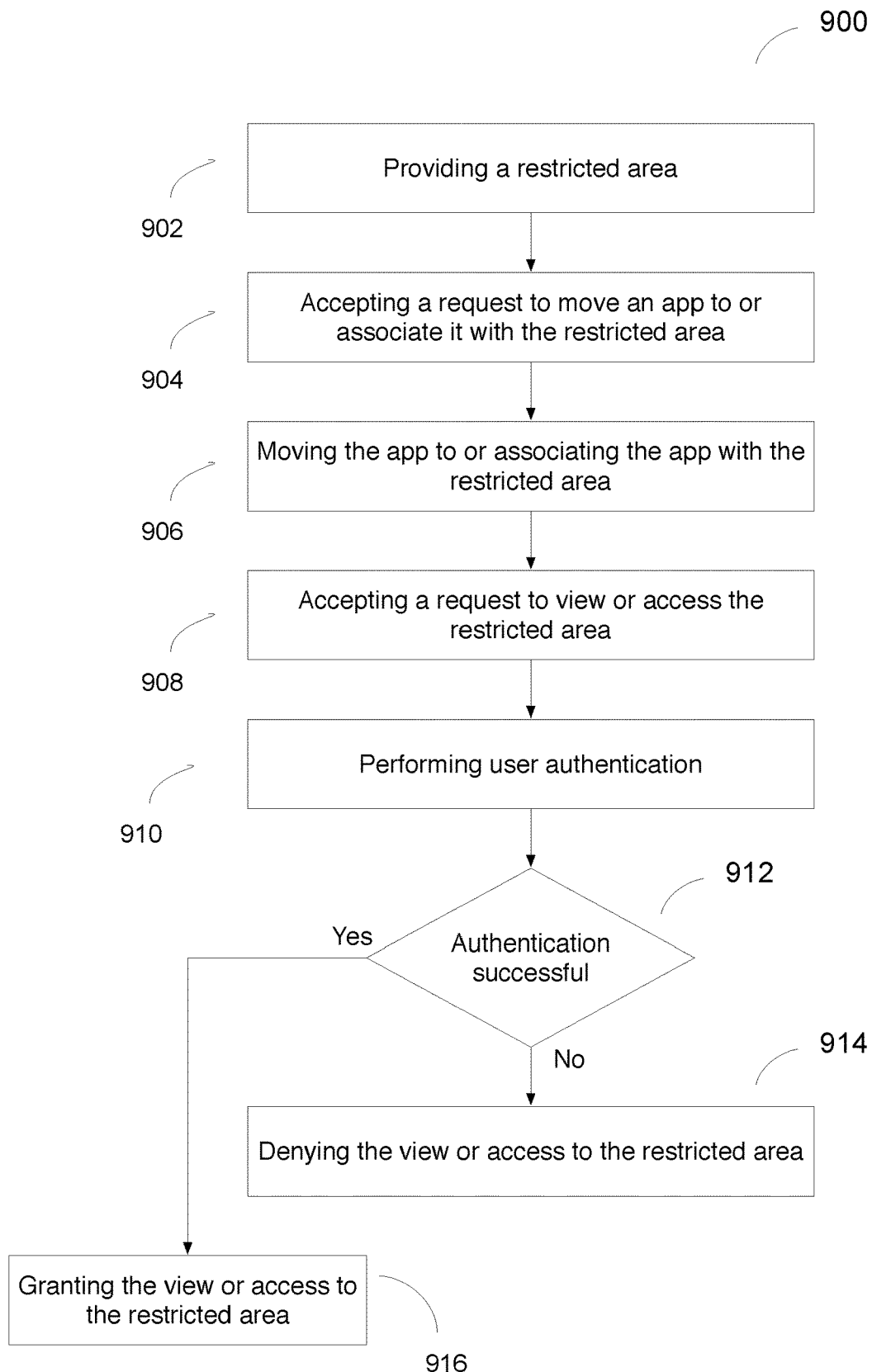
FIG. 9 shows a first computerized method in accordance with an embodiment.

FIG. 9 shows a flow diagram of an exemplary process 900 for configuring an app for authentication on a device, such as the one shown in FIG. 7, with a display or screen an example of which is depicted in FIG. 8. For instance, per the example process 900, the user interface 722 provides a restricted area, view or screen (902), which may be disabled, enabled or otherwise configurable by the user. If there are no user credentials available yet, the user request handler 708 will cause the authenticator 706 to interact with the user via the user interface 722, so to obtain them, before the restricted area, view or screen may be activated, enabled or otherwise created. (In one embodiment, the user password for the device, if available, will be used as the initial user credentials for restricted areas, views, or screens.) The authenticator 706 (or in some embodiments, the user request handler 708) will store the information in the user credentials in the data store. The user request handler 708 accepts a request via the user interface 722 to move an app to or otherwise associate it with the restricted area (904), such as having the user pressing, holding and dragging the app icon from an unrestricted area, view or screen, to the restricted one. The handler 708 causes the user interface to remove the app icon from the unrestricted area to the restricted one (906), and stores in the secure access definitions 718 this membership in or association with the restricted area, view or screen. (Such setting in the secure access definitions 718, for example, may cause the data maintained by or otherwise associated with the app to become unavailable to other apps that may otherwise have access to them, such as the data in Contact Book app being available to the Phone app.) Then the user request handler 708 receives a request from the user via the user interface (e.g., by gesturing the intent to access the restricted area from the unrestricted one, such as those shown in FIG. 8) to access the restricted area (908). The handler causes the authenticator to request user credentials (e.g., password) or otherwise authenticate with the user (910). If the authentication is successful (912), then the authenticator causes the user request handler to make visible or otherwise accessible the restricted area to the user via the user interface (916), thereby enabling access to the apps therein, as well as making available the data of these apps to other apps. Otherwise, the secured area access request is denied (914).

Figure 10:
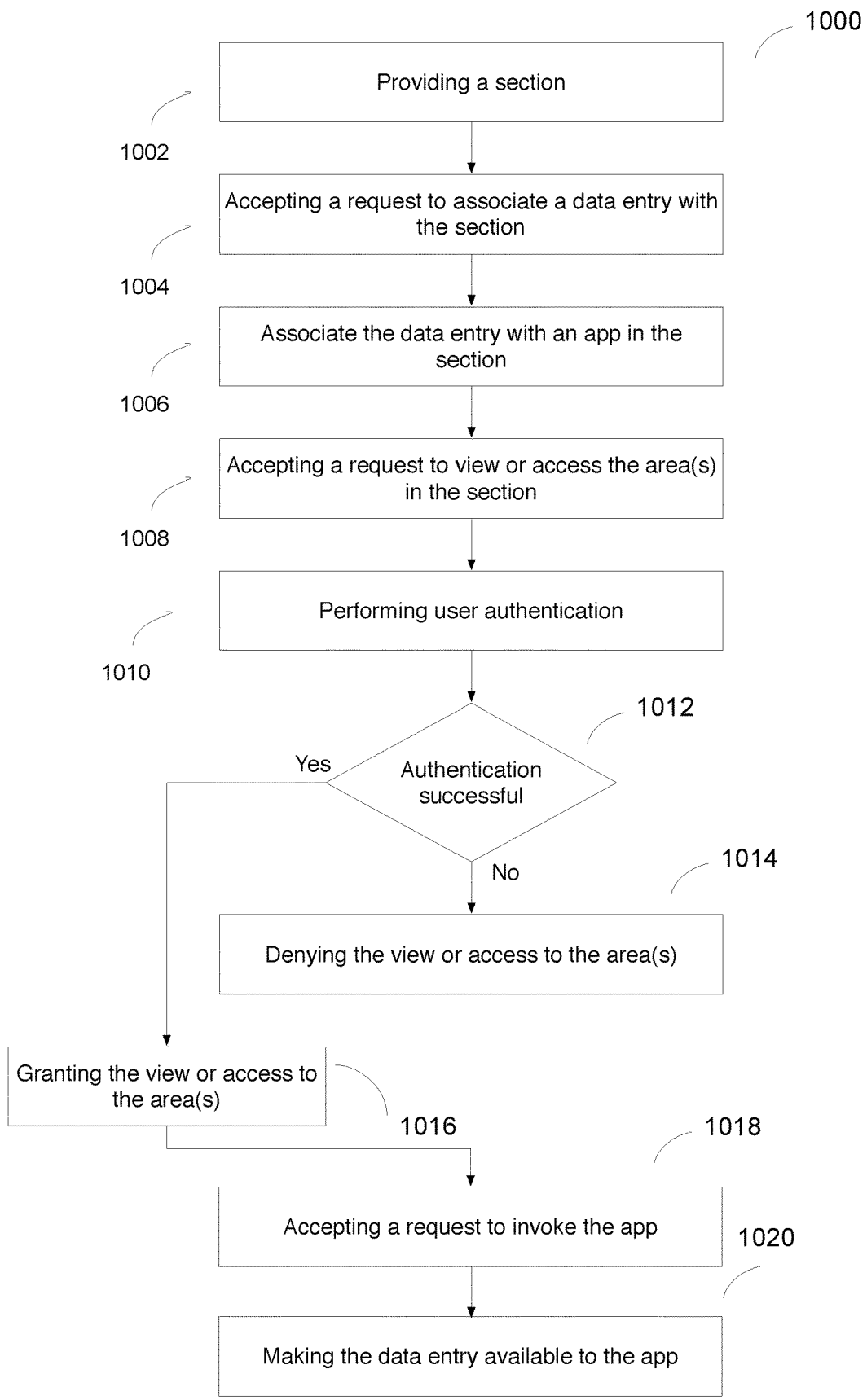
FIG. 10 shows a second computerized method in accordance with an embodiment.

FIG. 10 shows a flow diagram of an exemplary process 1000 for assigning a data entry (e.g., a contact entry, a photo, an email address) to a section of restricted areas available on a device, such as the one shown in FIG. 7. For instance, per the example process 1000, the user interface 722 provides a section of restricted areas, views or screens (1002). It accepts from a user a request to associate a data entry with the section (1004). The User Request Handler 708 identifies one or more apps that can handle the type of the data entry or are otherwise associated with the type, and associates the data entry with the one or more apps (1006). It stores this association information in Secure Access Definitions 718. The User Interface 712 accepts a request to view or access a restricted area in the section (1008). The Authenticator performs user authentication (1010). If successful (1012), it grants access to the area (1016); otherwise it denies the access (1014). When the User Request Handler 708 accepts a request to invoke one of the one or more apps in the area upon successful authentication (1018), it makes available the data entry or data related to the data entry to the invoked app (1020).

The embodiments as described above enables a user to restrict access to an app that may not have any authentication capability itself, without the need for the device-wide authentication. For example, a parent may create a secure visual area, and place a phone app in that area, so that his kids cannot access the app without successful authentication. Or he may place a video browsing app or a Web browser in the secure area, which only requires authentication outside a certain period during a day, given that access to the date setting function for the device is also restricted. In the other words, an embodiment of the present invention enables a user to organize and manage invocation or execution-level authentication for a group of apps collectively even when the apps are not capable of doing so.

In some embodiments, data from restricted apps may not be visible or accessible to apps whose access is otherwise unrestricted. For example, if a contact book app is restricted while a phone app is not, then the phone app although functional (e.g., for making calls) cannot access to the data provided or otherwise maintained by the contact book app, and history information that the phone app may maintain should hide or otherwise omit entries that are derived from or otherwise related to the data of the contact book app.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on computer readable media, the logic configured to perform methods of the invention. The examples provided herein are exemplary and are not meant to be exclusive.

In addition, a service or application available on a user device may be made accessible to a compatible service or application on another user device for purposes of relaying a message or data sent by or addressed to a user on the other user device. For example, a user of a service (e.g., an electronic messaging service provided by one or more computing systems comprising a messaging system and a user device) may indicate to the service (e.g., via an application associated with the service where the application is running on a device of the user) that another user of the service is authorized to use a device of the user to relay, send, or receive messages or data sent by or addressed to the other user. This authorized access to such functions or capabilities on a device of the user is limited to a device of the other user whose user identity can be authenticated or otherwise ascertained.

Figure 11:
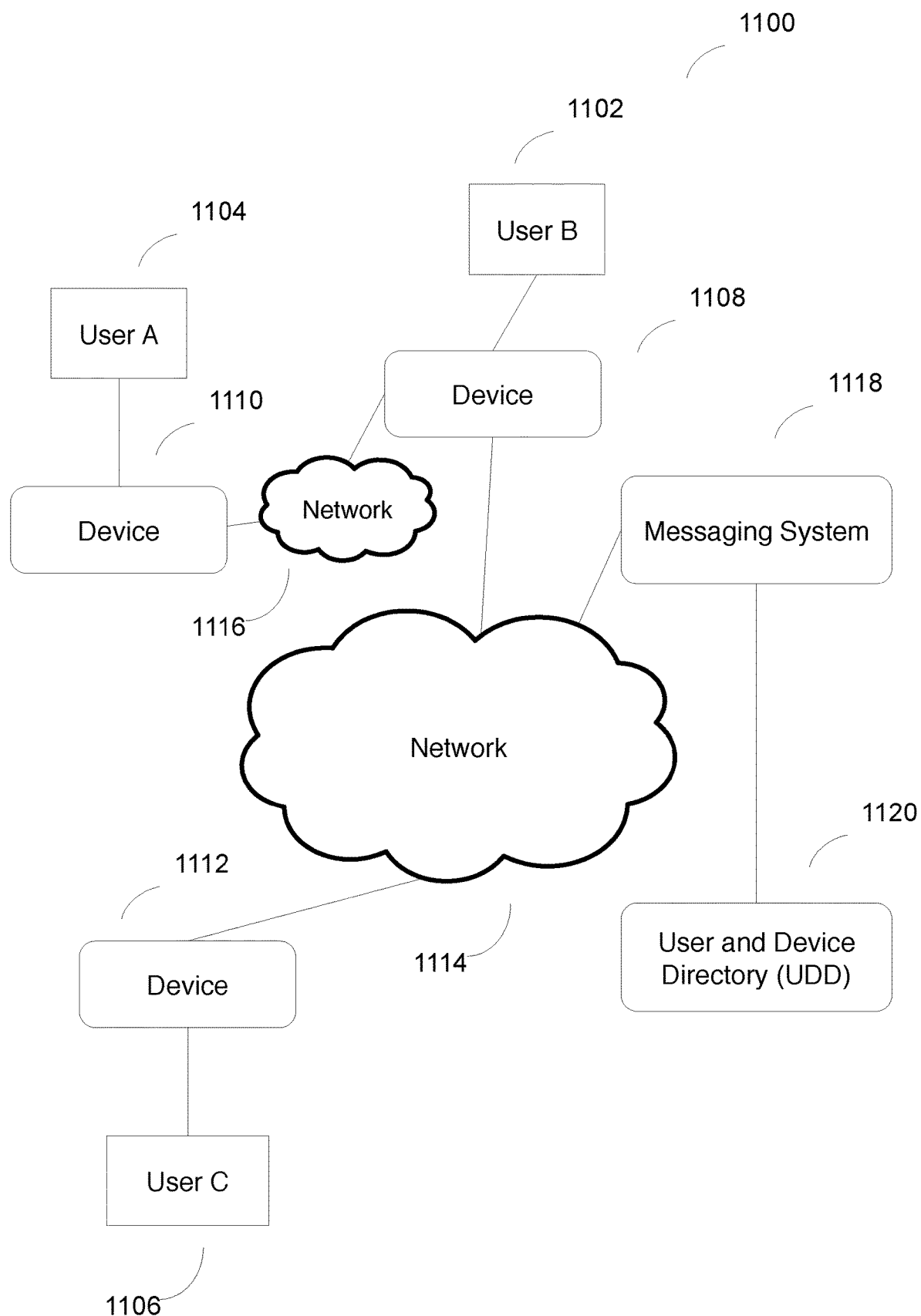
FIG. 11 shows an example environment in accordance with an embodiment.

For instance, FIG. 11 illustrates an exemplary environment 1100, according to an embodiment, for enabling a device 1110 of User A 1104 to make use of a device 1108 of User B 1102 to send and receive messages or data to and from User C 1106, when a network 1114 (e.g., the Internet) through which User C, his device 1112, or a messaging system 1118 can be reached is unavailable to the device 1110 of User A. For example, the device 1110 of User A may be communicatively connected or linked to, or otherwise reachable by the device 1108 of User B via another network 1116, e.g., a Bluetooth connection or a Wi-Fi network in non-infrastructure mode. Any type, mode or form of presence discovery and data transfer among devices is within the scope of the present invention, such as those utilizing near-field communication (NFC), Bluetooth, and Wi-Fi, or a peer-to-peer connectivity protocol or system.

As part of a signup process or user account configuration for the service, User B 1102 may specify or otherwise indicate to the messaging system 1118 that User A 1104 is permitted to receive and/or send messages (or data) through a user account of User B or a device associated with User B 1102. In one embodiment, User A may also indicate to the messaging system 1118 that messages sent by or addressed to him may be relayed through a device of User B. In one embodiment, such a permission or authorization in itself neither allows User A 1104 to interact directly with a device of User B, nor enables User B 1102 to gain visibility or access to these messages.

In one embodiment, when the messaging system 1118 receives a message addressed to User A, for example, received from the device 1112 of User C, it determines if a device of User A is available (e.g., by not receiving a periodic poll from an application or device associated with User A 1104, or by sending asynchronously or unilaterally such as via Web Socket a notification to an application or device associated with User A 1104). Should a device of User A be deemed unreachable, the messaging system 1118 may identify a device of another user, e.g., by consulting with a user and device directory (UDD) 1120, which, in one embodiment, is a database system that maintains information on one or more devices that are associated with each user of the service, and information on one or more users who are permitted to use devices associated with a particular user for relaying messages. In relation to that User A 1104 is permitted to use devices associated with User B 1102 and that the device 1108 is associated with User B 1102, the messaging system 1118 may deliver the message whose sender is User C 1106 to the device 1108 of User B, which forwards or otherwise sends it to the device 1110 of User A for presentation to User A 1110 or consumption by a compatible application associated with User A 1110. In one embodiment, the device 1108 of User B or the application receiving the message on the device does not disclose the message to User B 1102. In another embodiment, the device 1108 of User B or the application receiving the message may disclose the information in the message and any attachments or media associated with the message to User B 1102 when User B 1102 is also a recipient of the message. This mechanism or arrangement may save or otherwise reduce data usage of transmission or transfer bandwidth through the network 1114 with respect to User A 1104 and User B 1102 together, as it would otherwise take two payloads of similar size and format to deliver the content in the message to two users of the service.

Whereas an application on a device should reject or would otherwise not receive a message addressed to users that do not have an account with the application running on the device, an application in one embodiment may accept such a message and identify these recipients. The application may maintain a local list of users that User B 1102 has authorized their associated devices to receive and send messages via his device 1108, and it may obtain, receive, or update such a list of users at the messaging system 1118 (which may store and maintain this information at UDD 1120). In one embodiment, these users also agree to use a device associated with User B 1102, such as the device 1106 of User B, to relay their messages to and from their individual devices.

In one embodiment, while a device such as the device 1110 of User A 1104 may maintain its own list of authorized users, the messaging system 1118, in connection with UDD 1120, may provide and maintain a service or system-wide database for such information for all users of the service. For example, when a messaging application on the device 1110 of User A detects that there is no connectivity or communication path at the device to the network 1114 (e.g., the Internet) that would have enabled its messages or data to reach the messaging system 1118, it searches for connectivity to other devices that may reach the messaging system 1118, where these other devices may have a compatible message application running thereon. For example, in one embodiment, the messaging application may detect presence of another device through the network 1116 (or via a means of connectivity not necessarily regarded as a network, such as NFC) and exchange user identity information with the compatible messaging application on the other device. In one embodiment, the compatible messaging application may send the user identity information about User B 1102 to the messaging application on the device 1110 for presentation to User A 1104, who may then, for example, confirm the identity of User B 1102 and trust the device 1108 of User B to relay his messages. In another embodiment, the compatible messaging application may request user identity information about User A 1104 for presentation to User B 1102 who may then, for example, permit the device 1108 of User B to relay messages for the device 1110 of User A.

In one embodiment, User A 1104 may interact with his messaging application on his device 1110 so to indicate via the device 1102 of User B to the messaging system 1118 that the device 1108 of User B or the compatible messaging application on the device 1108 of User B is allowed to receive and send messages on behalf of User A 1104. For instance, User A 1104 may authorize the sending by his device 1110 to the device 1108 of User B 1102 of a code or token uniquely identifying User A 1104 to the messaging system 1118, or any messaging service-specific identification information about User A1104 that cannot easily be tempered with by User B 1102 or other users. In one embodiment, such identity information or credential may be one-time use. In another embodiment, such identity information or credential may be exchanged securely between the two devices or the two applications on these devices. In one embodiment, the device 1108 of User B may use this identity information about User A 1104 to register with the messaging system 1118 over the network 1114 that messages addressed to User B may now be sent to the device 1108 of User B, and that messages whose sender is User A 1104 may now come from the device 1108 of User B. While the application on the device 1108 of User B may handle these messages, it may not allow access to them to User B 1102. In another embodiment, User B 1102 may have access to content contained in such messages if he is also a recipient of the messages.

In one embodiment, the information provided to the messaging system 1118 for assigning or otherwise associating the device 1108 of User B as a message relaying means to the device 1110 of User A may comprise identification information of User A 1104, the device 1110 of User A, User B 1102, and the device 1108 of User B. In another embodiment, identification information of User A 1104 may be derived or otherwise looked up, e.g., by the messaging system 1118, via identification information of the device 1110 of User A, or vice versa. Likewise, identification information of User B 1102 may be derived or otherwise looked up via identification information of the device 1108 of User B, or vice versa. In one embodiment, each piece of such information may be provided by its respective device to the messaging system 1118. In another embodiment, each piece of such information may be first collected by the other device that may then forward it to the messaging system 1118.

Any mode, form, or mean of user identification and authentication as well as resource authorization, such as adopting or adapting an OAuth protocol for granting access to select resources (e.g., messages addressed to User A 1104) to a third party (e.g., the device 1106 of User B), is within the scope of various embodiments of the present invention.

In one embodiment, a compatible application, which may be running as a background service or in an active mode on the device 1108 of User B, may report to the messaging system 1118 that a device associated with User A 1104, such as the device 1110 of User A, is communicatively coupled, linked, or otherwise associated with the application, and that the device associated with User A requests the messaging system 1118 to send from now on to the device 1108 of User B those messages addressed to User A 1104, and to receive messages whose sender is User A 1104 from the device 1106 of User B. In one embodiment, such a message relaying setup or arrangement can be manually requested by either User A 1104 or User B 1102, or either user device based on some calendar time information or a timer.

In one embodiment, when the compatible application on the device 1108 of User B receives a message addressed to User A, it may send it to the device 1110 of User A, for example, via the network 1116 from the messaging system 1118, for presentation to User A 1104. In another embodiment, when the compatible application on the device 1108 of User B receives from the device 1110 of User A a message whose sender is User A with, for example, User C 1106 as recipient, it may send it to the messaging system 1118 via, for example, the network 1114. The messaging system 1118 may then forward it to the device 1112 of User C for presentation to User C 1106. In one embodiment, such an application may belong to a secure area. Identities of users whose device may be granted access to the application may also be associated with the secure area.

In one embodiment, the device 1108 of User B (namely, the relaying device) may receive or continue to receive messages addressed to User A while the device 1110 of User A (namely, the relayed device) is unreachable to the relaying device, whether temporarily or otherwise. When later the reachability is established, the relaying device may then forward those messages to the relayed device. In one embodiment, this message storing and forwarding relationship between these two devices is one to one, and can be made temporary, e.g., the relaying device not being a server configured to receive and store messages for a user (e.g., User A 1104) without the need of consent from another user (e.g., User B 1102).

In one embodiment, the relayed device may establish or restore connection or connectivity with the messaging system 1118 over the network 1114. Such establishment or restoration may be detected by the relayed device, the relaying device, and/or the messaging system 1118, and made known to the messaging system 1118, so the messaging system may choose a desirable communication path (e.g., over the network 1114 or via the relaying device) to deliver the next messages. In one embodiment, the relayed device may receive duplicate messages that may come from different networks 1116, 1114. The application receiving these messages on the relayed device may remove the duplicate messages from presentation to its user (e.g., User A 1104) based on, for example, a message identifier or some sequence number that is unique across messages, whether alone or in combination with other readily available information, such as time information.

Unlike technologies that enable multiple devices to share a network connection or to work together to bridge different payload protocols, such as peer-to-peer mobile internet connection sharing or tunneling protocols, a particular embodiment would make it possible for a device to receive a message or data addressed to another user of a common or compatible application running on the device, and forward or otherwise relay the message or data to another device communicatively coupled to the other user, where the application or another instance of the application is also running on the other device. The other device may also send messages or data via the device where the other user is a sender of the messages or data, and the user is not a recipient. The selection of or permission for this communicative channel, path, or link between the device (or the application on the device) and the other device (or the application on the other device) for receiving and sending user messages or data is based on user identity and consent.

Figure 12:
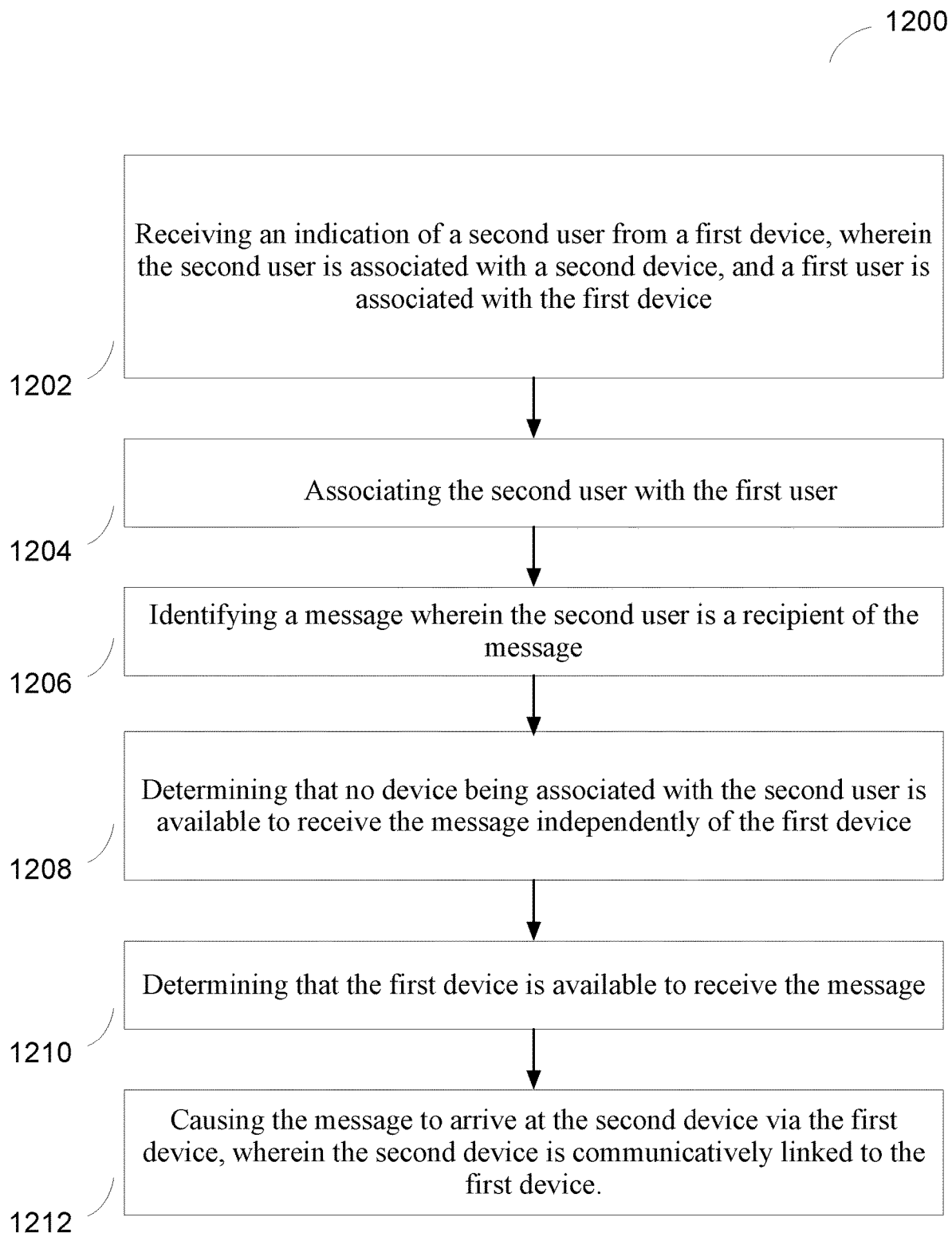
FIG. 12 shows a fourth computerized method in accordance with an embodiment.

FIG. 12 shows a flow diagram of an exemplary process 1200 for relaying a message to a user through an intermediary device of another user where, for example, the process or the steps as described may be performed under the control of one or more computing systems of a service, such as a real-time messaging service for text and multimedia. A computer system may be configured with executable instructions and may comprise a device local to a user, such as a mobile phone, and a device non-local to a user, such as a messaging system. Per the example process 1200, the computer system may receive from a device an indication of another user, such as an identification of the other user, where the device is associated with a user (e.g., an application with the user logged on is running on the device), the other user has access to a device that was, is, or will be known to the computer system, and the device is communicatively connected to the computer system over a network (1202). In one embodiment, the indication of the other user may include identification information that is inaccessible to or un-modifiable by the user and may originate from the other device or from the other user. In another embodiment, the two users may have their own accounts with the computer system or the service, and each user cannot access the account information of another user unless he obtains the logon credential of the account.

The computer system may then associate the other user with the user (1204), for example, for alternative message delivery paths, should the device of the other user become unreachable. For instance, the computer system may receive an incoming message whose recipients include the other user, or identify an outgoing message in a database or another device (e.g., a server), the message having the other user as recipient (1206). In one embodiment, the computer system may receive an indication of the user from the other user or a device associated with the other user, so to permit a device of the user to relay messages addressed to the other user or whose sender includes the other user. In another embodiment, such a message may be specific to or otherwise associated with an application or a type of application that is configured to receive or send the message or messages of similar type. In one embodiment, a device in the computer system, such as a mobile phone of the user or the other user, may receive an indication of a user and present it to the user of the other use for acknowledgment or confirmation so to grant the association of the device with another device associated with the indicated user, for the purpose of relaying messages, e.g., the device being a message relayed device or a message relaying device.

The computer system may detect that there is no device that is reachable and has the other user logged on an applicable program running on the device (1208). In one embodiment, the computer system may detect that there is no device that has an applicable program or application running with the other user logged on, where the program or application is configured to receive or send the message or messages of similar type.

In relation to the association of the other user with the user, it may locate or otherwise identify a device that is reachable (1210). In one embodiment, the computer system may locate or otherwise identify in a database a device that has an applicable program running with the user logged on.

The computer system may then send the message to the applicable program running on the device of the user, which may in turn send via a communications link, channel, or path, the message to the applicable program on the device of the other user, for example, for presentation to the other user (1212). In one embodiment, the message may be stored in a third device, from which the computer system may cause the message to be delivered from the third device to the device of the user, and then from the device of the user to the device of the other user. A compatible program or application, for example, may run on the device of the user and the device of the other user to receive and/or send the message, and is associated with its respective user who is deemed to have logged on the program or application, where the user or the other user may change to another device running another compatible program or application. In one embodiment, the computer system may then cause delivery of the message to or from the other device automatically upon determining that the user or other user is deemed to have logged on the other compatible program or application.

Figure 13:
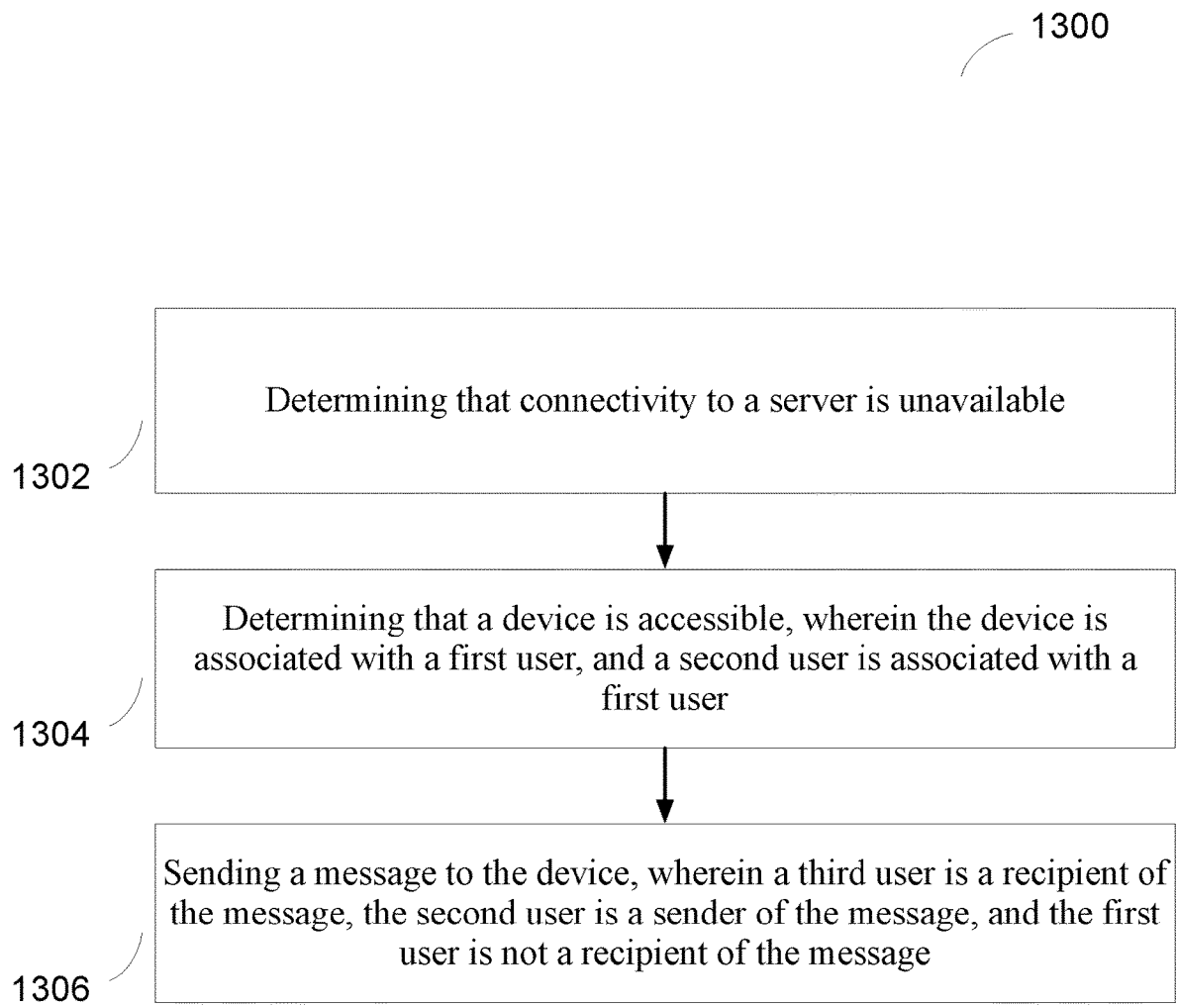
FIG. 13 shows a fifth computerized method in accordance with an embodiment.

In one embodiment, a message-relayed device may detect a message-relaying device and send a message through the latter when it loses communication to the messaging system, or connectivity to the network that may enable it to reach the messaging system. For instance, in accordance with one embodiment, FIG. 13 shows a flow diagram of an exemplary process 1300 for sending a message through a message-relaying device. A computer system may be configured with executable instructions and may comprise a device local to a user, such as a mobile phone, and/or a device non-local to a user, such as another mobile phone local to another user. Per the example process 1300, the computer system may determine that connectivity to a network or a server, e.g., a message system, is no longer available (1302). The computer system may then detect a device that it may reach (e.g., a nearby device that can be connected via a peer-to-peer connectivity or protocol), and that the device belongs to a user that the user of the computer system trusts, or is otherwise associated with an authenticated user that he trusts (1304). For instance, a first application on the computer system may request a compatible second application on the device to provide an identification of its user, which may match the identification information of the other user that the user has indicated to the first application that the user trusts the other user, devices associated with the other user, or a specific device associated with the other user. In relation to identifying the device as being associated with the other user, the computer system may send a message to the device, where the sender of the message is attributable to the user of the system, a recipient of the message is attributable to yet another user, but does not include the other user (1306).

Figure 14:
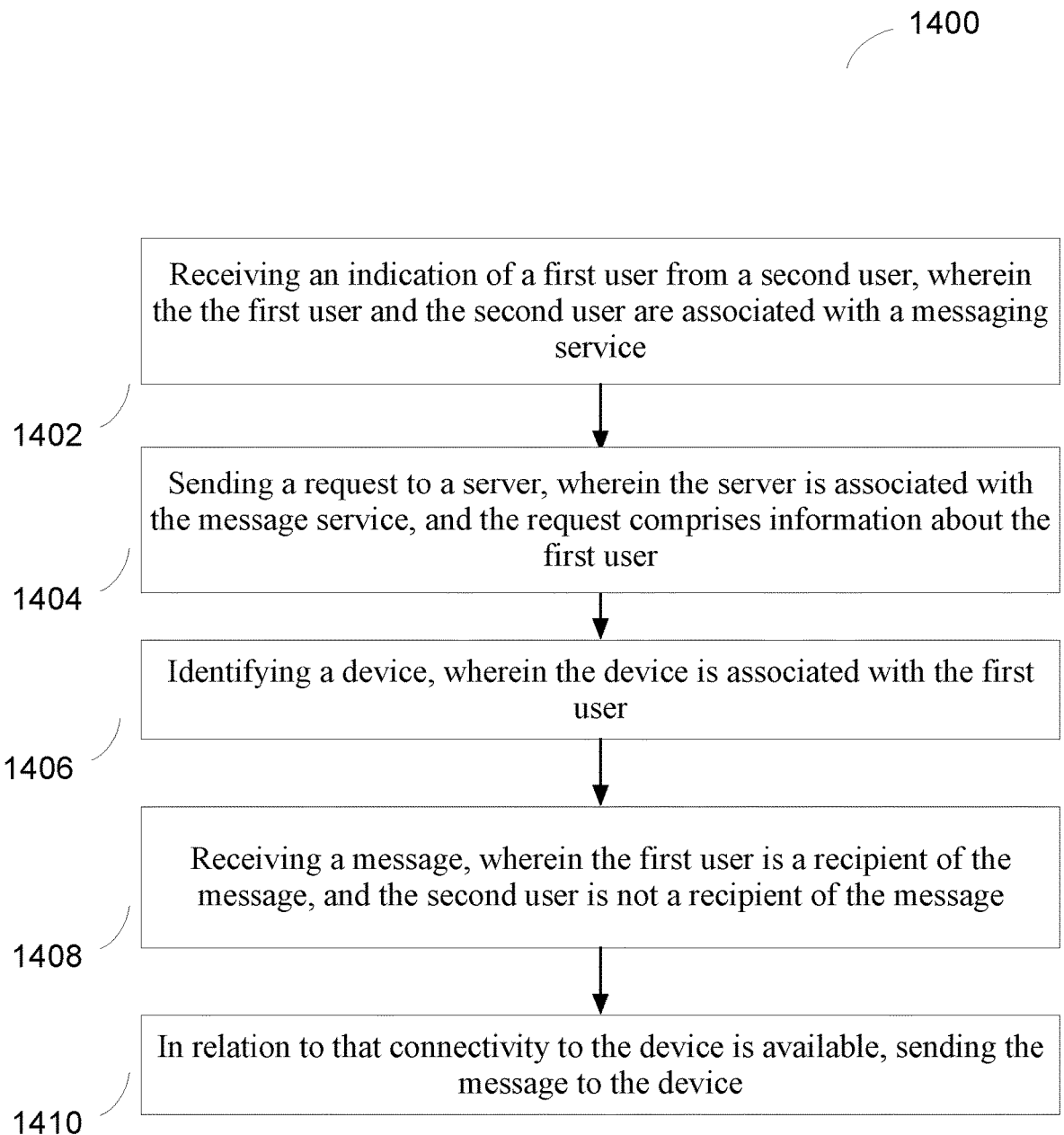
FIG. 14 shows a sixth computerized method in accordance with an embodiment.

In one embodiment, a message-relaying device may detect a message-relayed device or a device that is requesting to have another device to relay its messages. For instance, in one embodiment, FIG. 14 shows a flow diagram of an exemplary process 1400 for receiving a message on behalf of another device where the message is addressed to a user on the other device. A computer system may be configured with executable instructions and may comprise a device local to a user, such as a mobile phone, and/or a device non-local to a user, such as another mobile phone local to another user. Per the example process 1400, the computer system may receive an indication of a first user from a second user, where both users have an individual account with a common messaging service (1402). For example, the computer system may be local to the second user. It may receive from another device a request to use an application on the computer system to relay messages, where the request identifies the first user making the request or otherwise being associated with the other device. The second user may then decide to accept this request based on the identity of the first user, and indicate to the computer system as such. In one embodiment, the computer system may then send a request to a server associated with the message service, where the request identifies the first user whose messages are acceptable to devices associated with the second user for relaying (1404). The computer system may also identify the other device associated with the first user for purposes of receiving from the messaging service the future messages addressed to the first user and sending to the messaging service the incoming messages whose sender is attributable to the first user (1406). For instance, the computer system may receive a message addressed to the first user but whose recipient does not include the second user (1408). In relation to that connectivity to the other device (e.g., one that is local to the first user and has the first user authenticated) is available, the computer system may send the message to the other device (1410), for example, for presentation to the second user. In one embodiment, should connectivity to the other device be unavailable, the computer system may store the message. It may then send the message to the other device when such connectivity is available.

In another embodiment, a computer system equipped with the present invention may receive an indication of a first user from a second user, wherein the first user and the second user are associated with a messaging service, and the first user is associated with a device. (For instance, a generous user, i.e., the second user, with a mobile phone. i.e., the computer system, can help out his friend, i.e., the first user, to receive the latter's messages even when the latter (i.e., his friend) has his own communication device, i.e., the device. For example, the friend's device might have no connectivity to its service provider or it may incur roaming charges that the generous user's won't. The generous user enters on his mobile phone an identification of his friend, where the identification could be the user name of his friend with the messaging service, or a secret code unique to his friend provided by the messaging service.) The computer system may send a request to a server, wherein the server is associated with the messaging service, and the request comprises information about the first user. (For instance, the generous user's mobile phone sends a request to a server associated with the messaging service, where the request identifies the friend whose messages may be forwarded to any device associated with the generous user.) The computer system may identify the device associated with the first user. (For instance, the generous user's mobile phone identifies a wireless device, e.g., another mobile phone within the vicinity, the wireless device being associated with the friend.) The computer system may receive a message, wherein the first user is a recipient of the message, and the second user is not a recipient of the message. (For instance, the generous user's mobile phone receives a message, e.g., via or from the messaging service, where the friend is a recipient but the generous user is not.) The computer system may send the message to the device, in relation to that connectivity to the device or between the computer system and the device is available. (For instance, the generous user's mobile phone forwards the message to the friend's wireless device, provided that there is connectivity to the wireless device or between the mobile phone and the wireless device.)

In one embodiment, a user who requests a messaging service or a computer system equipped with the present invention to deliver his messages via a device associated with an account of another user may do so on or via a device associated with the other user. For instance, upon receiving an instruction from the user, the user's device may send a request to the other user's device which in turns delivers it to the messaging service that would then deliver messages addressed to the user to the other user's device which in turn may send the messages to the user's device. In another embodiment, the user may also perform such a request on the other user's device. In one embodiment, a messaging system equipped with the present invention may require that a first device associated with a beneficiary user (e.g., having the beneficiary user successfully been authenticated on the device) be in vicinity of or communicatively reachable via a second device associated with a helping user, in order to accept or authorize a request from the beneficiary user and/or the helping user to deliver messages addressed to the beneficiary user to the first device via the second device. For such determination, the messaging service may, for example, cause the second device (e.g., via software or an application on the first device and/or the second device) to retrieve or otherwise receive information from the first device, wherein the information identifies the beneficiary user who may have access to the first device. In another embodiment, an authorization scheme or technique such as OAuth may be used or adapted to authorize temporary or revocable access to a message-forwarding device (i.e., one associated with a helping user) and/or a message-forwarded device (i.e., one associated with a beneficiary user), or access to software or an application on the device that is responsible for the message-forwarding and/or message-forwarded functionality. In yet another embodiment, the first device and the second device may, with a permission from the beneficiary user and/or the helping user, exchange such identification information or equivalent (e.g., a user identifier, account password, and device identifier), and send it to a server associated with the messaging service in a secure manner (e.g., information exchange in encrypted form). The messaging service may then determine based on at least the received information whether that the helping user has authorized the use of his device to forward messages addressed to the beneficiary user to a device of the beneficiary user, and that a device of the beneficiary user is reachable via a helping user's device.

In one embodiment, the messaging service may require a "direct" authorization from the beneficiary user where, for instance, a permission or authorization is to be sent comes from a device or account not accessible to the helping user but the beneficiary user. It may be in contrast to a manner where, for instance, a secret or unique code specific to a beneficiary user (or a communication session pertaining to the beneficiary user) is generated by the messaging system (or a device or application having authenticated the beneficiary user), given to a helping user, and then submitted to the messaging system by the helping user, thereby making messages addressed to the beneficiary user to be available to another device not previously or normally associated with the beneficiary user (i.e., for the purpose of forwarding the messages via the other device to a device associated with the beneficiary user). In one embodiment, a submission of such a secret or unique code to the messaging service from a device or application having authenticated the helping user is sufficient to establish authorization from both the helping and beneficiary users, thereby activating such message forwarding that involves a central control (such as a server associated with the messaging service), an intermediary or a third-party device (such as a helping user's device), and a destination device (such as a beneficiary user's device). Any type of authentication and authorization is within the scope of various embodiments. In one embodiment, a message forwarding setup or arrangement from one device to another device may expire, for example, upon a period of time from the successful authorization or authentication associated with the message forwarding service or arrangement. In one embodiment, a beneficiary user may receive and/or conduct real-time communication, e.g., voice call or video call, on his device through facilitation by another device associated with the helping user, based on the same, similar or adapted techniques or steps described herein.

Figure 15:
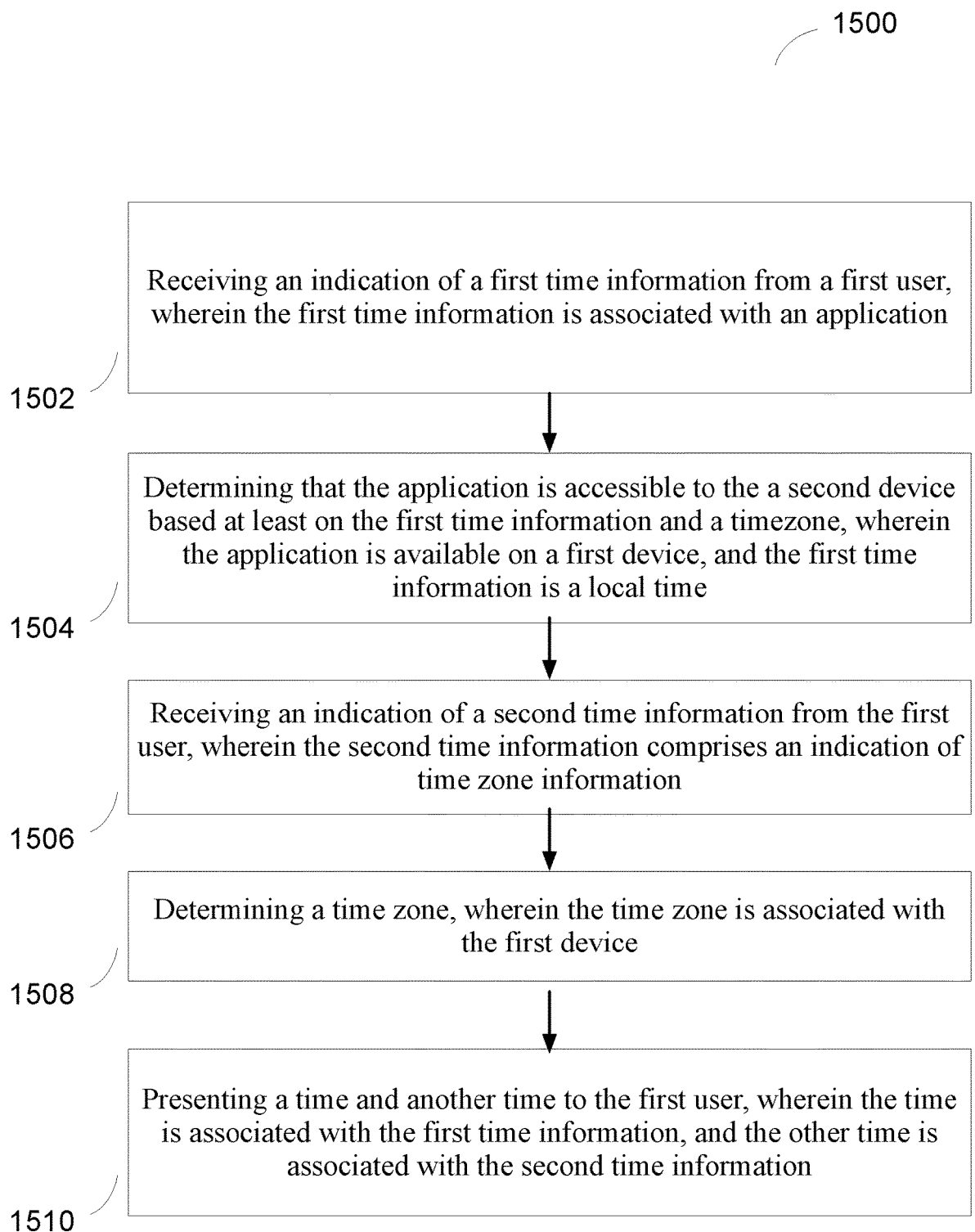
FIG. 15 shows a seventh computerized method in accordance with an embodiment.

The access to a relaying device associated with a user by a relayed device associated with another user may also be controlled or otherwise managed based on time information, e.g., time of day, a time range, a calendar time, or a combination thereof. FIG. 15 shows a flow diagram of an exemplary process 1500 for presenting time information based on a time zone-independent time in a time zone-aware context, where, for example, the process or the steps as described may be performed under the control of one or more computing systems, such as a calendar application on a mobile device. A computer system may be configured with executable instructions and may comprise a device local to a user, such as a mobile phone, and/or a device non-local to a user, such as a messaging system. Per the example process 1500, the computer system may receive an indication of a time information from a user (1502), where, for example, the time information may comprise a time when the computer system or an application on the computer system is accessible to a device associated with another user.

The computer system may then determine that a corresponding application on the computer system is accessible to a device associated with another user based on the time information and a time zone (1504). In one embodiment, the time zone may be associated with the current time zone of the computer system. In another embodiment, the time zone may be associated with the current time zone of the device. In one embodiment, the time information may be a local time pertaining to the computer system. In another embodiment, the time information may be a local time pertaining to the device. In one embodiment, the computer system may determine a time based on a time zone and the time information that is independent of a time zone (e.g., a local time), such that the time reflects the intended time of the time information in the time zone or the context of the time zone.

The computer system may also receive an indication of a second time information, for example, from the user, where the second time information comprises an indication of a time zone (1506). For example, such a second time information may indicate when access to the device by the other device associated with the other user is to begin or to end. In one embodiment, the computer system may determine a time zone to interpret the first time information and/or the second time information (1508). In one embodiment, such a time zone may be the current time zone of the computer system, the device, or the other device.

In relation to a time zone information, a first time information that is independent of a time zone, and a second time information that is specific to a time zone, the computer system may present to the user, e.g., via a schedule, calendar, or time table, an indication, e.g., a view, of a time and another time (1510). For instance, in one embodiment, the time may be determined based on the first time information and the time zone information and the other time may be determined based on the second time information and the time zone, where both the time and the other time are presented correctly in relation to each other and in accordance with the time zone. In another embodiment, a user may enter into a device (or an application on a device) a first entry (e.g., a reminder, event or to-do item) that is of a local time (e.g., 12 pm, with the present time zone being GMT), and later a second entry of a time specific to a time zone (e.g., 1 pm GMT). When the user travels to a new location where his new time zone on the device, or the application on the device, is set (e.g., automatically via a GPS-based detection mechanism, or manually by the user himself), the device or the application would present the first and second entries correctly in relation to the new time zone (e.g., HKT) based on, for instance, the original time information and the new time zone information, e.g., the first entry being displayed with the same local time in the new time zone (e.g., 12 pm, with the present time zone being HKT), and the second entry being displayed with a different time based on the new time zone (e.g., 9 pm HKT). In one embodiment, in addition to setting an entry as a local time (i.e., non time zone-specific), a user may explicitly set or otherwise associate the time zone of a time zone-specific entry to or with one that is different from the time zone that the device or application currently operates or is set at. The device or the application would likewise be able to present the entry correctly along with other entries in relation to the current time, or any present time zone.

Figure 16:
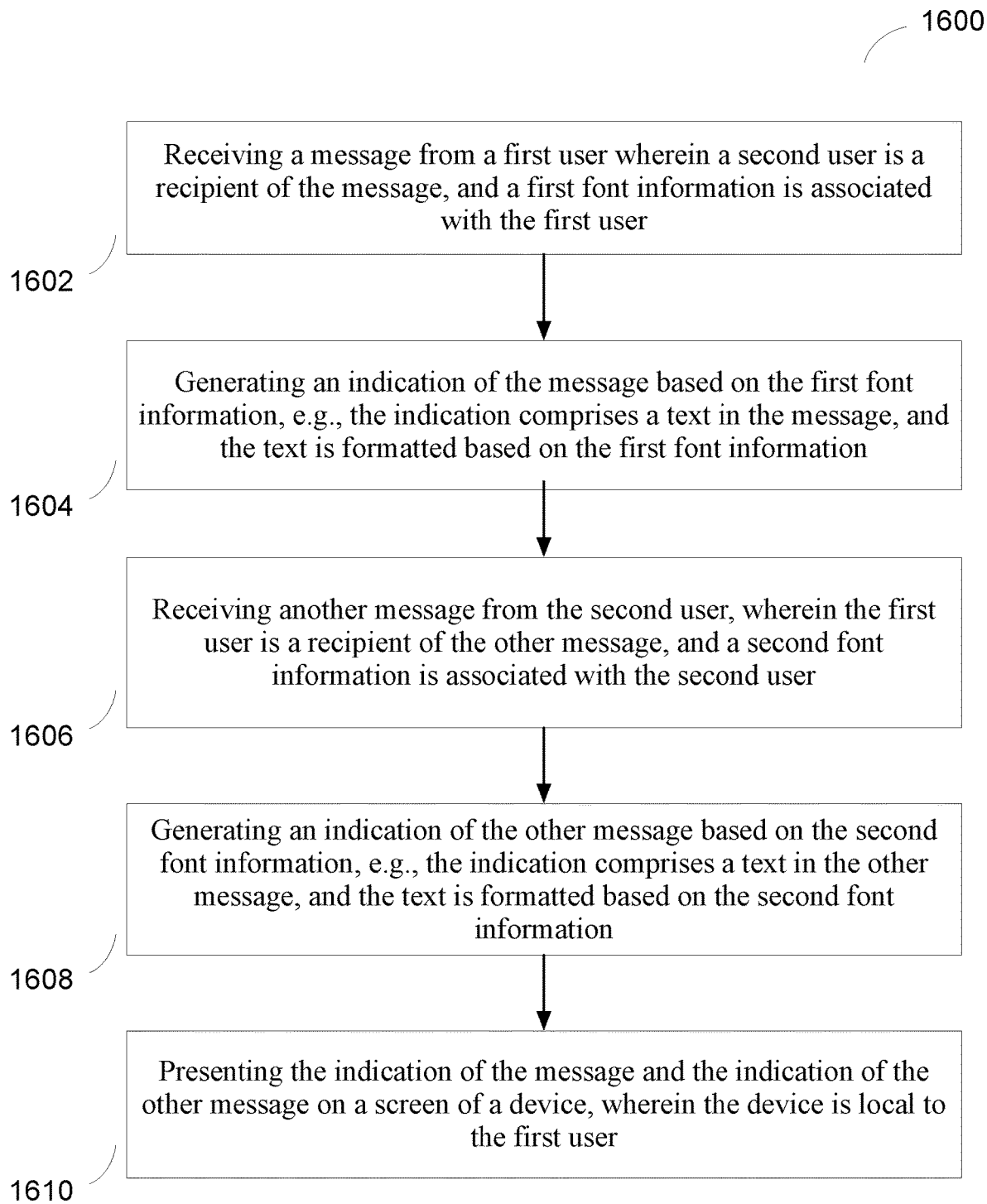
FIG. 16 shows an eighth computerized method in accordance with an embodiment.

The identity of a user of a message-relayed device or a message-relayed application on a device may also be indicated with a personalized font for text information in a message. FIG. 16 shows a flow diagram of an exemplary process 1600 for generating and/or presenting a message based on font information that is specific to a sender of the message, where, for example, the process or the steps as described may be performed under the control of one or more computing systems, such as a messaging application on a mobile device. A computer system may be configured with executable instructions and may comprise a device local to a user, such as a mobile phone, and/or a device non-local to a user, such as a messaging system. Per the example process 1600, the computer system may receive a message whose sender is attributed to a first user and whose recipients include a second user, where a first font information, e.g., Helvetica, is associated with the first user (1602). In one embodiment, such a font information may contain a font that corresponds to the handwriting of the first user. In another embodiment, the first font information and its association with the first user may be maintained at a device associated with the second user, the device having received the message. In one embodiment, the message may comprise the first font information, or a device associated with the second user may receive an indication of a message, where the indication may include the first font information. In relation to receiving the message, the computer system may generate an indication of the message based on the first font information (1604). For example, a text in the message may be formatted in accordance with the first font information.

Likewise, the computer system may receive another message whose sender is attributed to the second user and whose recipients include the first user, where a second font information, e.g., Arial, is associated with the second user (1606). In relation to receiving the other message, the computer system may generate an indication of the other message based on the second font information (1608). For example, a text in the other message may be formatted in accordance with the second font information.

In relation to the two indications each comprising a message from a different user, the computer system may present them to a user via a device screen (1610), where, for example, the two messages are displayed in two different fonts, each being associated with its respective user. In one embodiment, an indication of a font for association with a user from the user himself would cause a message sent from the user to include information related to the font, and a recipient device would display or otherwise render the message in accordance with the font. In another embodiment, subsequent messages may not comprise any font information and the recipient device would continue display or render the messages in accordance with the font, until it receives new information related to another font and the sending user. For instance, the recipient device may store the font information in its local database for each of its senders or group of senders. It may also retrieve the font information from a server which has received identification and font information related to a user and provides an interface (e.g., a RESTful API) for the recipient device to fetch or query for this information based on some user identity.

Figure 17:
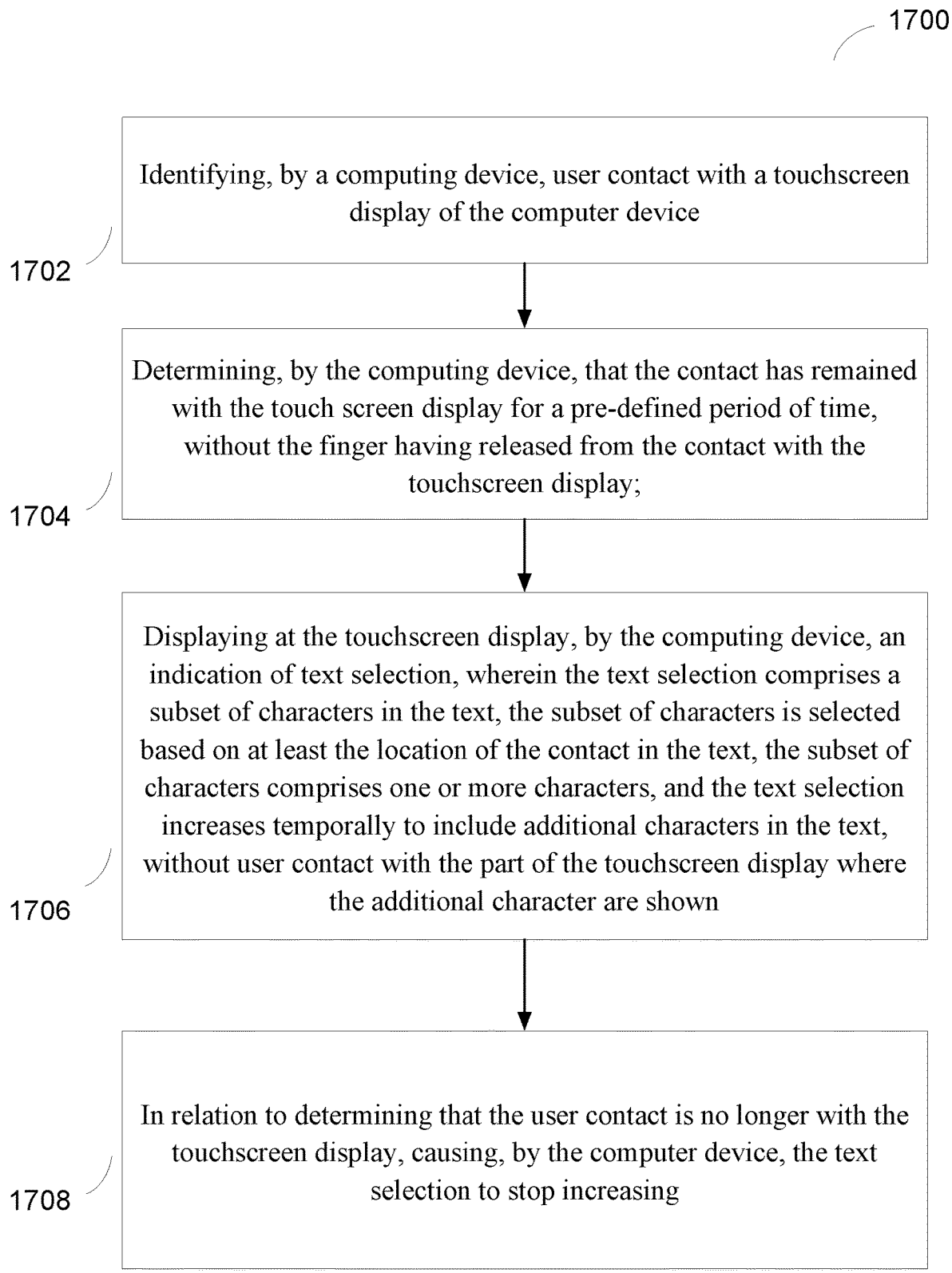
FIG. 17 shows a ninth computerized method in accordance with an embodiment.

When composing or editing a message, a user may select from existing text, whether from the message being composed or another message. FIG. 17 shows a flow diagram of an exemplary process 1700 for selecting a portion of text from text being displayed on a touchscreen of a computing device via user contact. For instance, such text selection may highlight the text to be copied, cut or otherwise included for further manipulation or operation. Per the example process 1700, a computing device such as a mobile phone may identify, detect, or recognize user contact with a touchscreen display of the computing device, wherein, for example, the user contact may include or otherwise be associated with a finger that initiated contact with the touchscreen display in a specific location where text is shown or displayed (1702).

The computing device may determine that the contact has remained with, or the finger has remained in contact with, the touch screen display for a pre-defined period of time, without the contact having left from, or without the finger having released from the contact with, the touchscreen display (1704). In other words, the computing device has detected a press gesture, or a touch held in the same location beyond a time threshold, e.g., one that is longer than what may constitute a tap gesture, on a touch screen display where the text is being shown.

In relation to determining that the user contact has remained with, or the finger has remained in contact with, the touch screen display, the computing device may show at the touchscreen display an indication of text selection, wherein, for example, a subset of characters in the text is selected based on at least the location of the contact in the text, the subset of characters comprises one or more characters, and the text selection increases temporally or over time to include one or more additional characters in the text, without user contact with, or the finger or another finger having had contact with, the part of the touchscreen display where the one or more additional characters are visually positioned or otherwise shown (1706). For example, such an indication may include highlighting of the selected text on the touchscreen display, or capturing of the selected text to another location, visually or otherwise, that may provide feedback to the user. Any mode or mechanism of indicating text selection or identifying text in a text selection is within the scope of the various embodiments.

For instance, in one embodiment, the initially selected text upon a press gesture detection may include a single character. In another embodiment, it may include a single word. Any direction, rate, or scope of adding additional characters to the selection during the press gesture is within the scope of the various embodiments. For example, in one embodiment, the process may be unidirectional towards the right starting from the user contact related to the press gesture (e.g., for left-to-right languages), and include one character at a time continually or in discreet steps, traversing horizontally (or vertically) from line to line (or from column to column). In one embodiment, after a predefined period of time, each new addition to the text selection would comprise a word delimited by space or some other punctuation. In another embodiment, it may also include the punctuation(s) before and/or after the word. Any letter to the left of the user contact but otherwise belongs to the same word of the letter(s) already in the text selection may then be added or otherwise included in the text selection. In one embodiment, the directionality (e.g., left, right, or both), rate (e.g., number of characters or words per second), and scope (e.g., character-based, word-based, punctuation inclusion, and their selection criteria) may be user-configurable.

In relation to determining, by the computing device, that the user contact is no longer with, or the finger has released from the contact with, the touchscreen display, the computing device may cause the text selection to stop increasing (1708). For instance, according to one embodiment, when the press gesture is detected to be over, the text selection would stop growing or increasing, and the indication of text selection may highlight or be a highlighting of the character(s) in the text selection. An indication of text selection may change in size, position, or color during or after text is selected or deselected, so may the selected characters and words when the selection process is paused, stopped, or completed. Any form of indication of text selection is within the scope of various embodiments.

In one embodiment, the computing device may present options, choices or a menu for operation to the user in relation to the text selection or characters included in the text selection. For example, the user may gesture to the computing device to cut the selected text from the source text (thereby removing it from the source text and saving it to a memory location or clipboard associated with the computing system), and gesture again to have it pasted onto another message or document. In another embodiment, the text selection or characters included in the text selection may automatically captured in a memory location, such as the clipboard, or by an application that is accepting as input a text selection from the user, wherein the application might have initiated the text selection process earlier.

In another embodiment, a mobile device with a touchscreen display may receive an indication of a press gesture in relation to a location in text, wherein the text is presented on the touchscreen display and the press gesture is distinct from a tap gesture as far as the mobile device is concerned. The mobile device may present at the touchscreen display an indication of text selection in relation to detecting the presence of the press gesture (or determining that the press gesture remains valid), where the text selection increases temporally or over time to comprise additional characters or text, without having received another gesture, and the indication of text selection may change in shape, size, font, and/or color, wherein the additional characters or text may include punctuations and are adjacent to the characters or text already in the selection. The mobile device may then present at the touchscreen display an indication of the text selection, wherein the text selection stops increasing, in relation or response to detecting the absence of the press gesture, or in relation to determining that the press gesture has been modified or an additional gesture or touch at the touchscreen display. For instance, according to one embodiment, the press gesture may become a drag gesture, or something similar or equivalent, where a finger that resulted in the press gesture may move over the surface of the touchscreen without losing contact with the touchscreen. In another embodiment, a change in gesture, such as from a press to drag, may signal to the mobile device to stop or pause the text selection from increasing or stop adding new characters to the text selection, which can be resumed when, for example, the finger has moved back to the proximity of the original point of contact by the finger. In one embodiment, the direction or directionality of change to the press gesture may indicate or signal a different instruction to the mobile device regarding the text selection. For example, for a left-to-right language, a drag gesture (e.g., horizontally) to the right originating from a proximity of the original point of contact of the press gesture (i.e., without losing contact with the touch screen display) may indicate pausing of text selecting or selection. A drag gesture (e.g., horizontally) back to the proximity of the original point of contact of the press gesture may indicate resuming of text selecting or selection (i.e., adding more characters or words to the text selection). A drag gesture (e.g., horizontally) to the left of and away from the proximity of the original point of contact of the press gesture may indicate text deselecting or deselection (e.g., having one or more characters or words deselected or otherwise removed from the text selection). A drag gesture (e.g., vertically) towards to the bottom of the touchscreen display and away from the proximity of the original point of contact of the press gesture may indicate speeding up the text selection (or deselection) from the current rate of adding (or removing) characters or words. A drag gesture (e.g., vertically) towards to the top of the touchscreen display and away from the proximity of the original point of contact of the press gesture may indicate slowing down the text selection (or deselection) from the current rate.

In one embodiment, a device equipped with a touchscreen display enables a user to select a subset of text shown on the display with a touch that does not lose contact with the screen or display, without the need of the user to touch or apply touch to the area, location or proximity of the screen or display where the characters or words in the text being added or to be added to the user selection of text are rendered, displayed or shown. For instance, upon receiving a touch gesture from a user, such a device may then determine that the touch gesture is, or may be deemed to be, a press gesture (or a gesture made by a finger or pointing object that remains in contact with the same screen or display location, or a pre-defined proximity of it, longer than what constitutes a tap gesture). The device may then indicate an initial set of text for the text selection (e.g., a character, several characters, a word, or several words including punctuations are highlighted on the screen or display). Upon detecting relocation of the touch that originated or resulted in the touch or press gesture, the touch having remained in contact with the screen or display throughout the relocation, the device may increase the text selection from the initial set towards one or more consecutive characters or words next to or adjacent to the existing characters or words in the current text selection. Where the available text for selection is not fully shown or rendered on the screen or display (e.g., when the text of a document is zoomed in on the screen or display), additional characters or words that are not visible on the screen or display but are otherwise next or adjacent to the existing characters or words in the current text selection may be added to the selection, until the end of line is reached. Then the first character or word on the following line, if any, may be added to the selection, even if it is not visible on the display or screen.

In addition, the directionality of the text selection (e.g., left, right or both) may be pre-configured and it may be based on the directionality of a language or script of interest (e.g., left-to-right, top-to-bottom). For example, for English, the text selection may start and expand towards the right edge or side of the display. Upon detecting relocation of the touch back to the vicinity of the point or location of contact of the original touch gesture that triggered or otherwise resulted in the initial text selection (e.g., press gesture), the device may pause the text selection, thereby allowing the user to resume increasing the text selection by dragging away from the point of contact of the original touch, or through a similar or equivalent gesture. Upon detecting that the touch has left the display or screen, or the finger that resulted in the touch is found to have lost contact with the display or screen, the device may stop the text selection, and proceed with the next operation regarding the selected text accordingly, such as storing the selected text in a memory location (e.g., clipboard), and/or presenting a menu of action or delivering the selected text to an application on the device or another device.

Moreover, while the user touch remains in contact with the screen or display of the device, the device may be responsive to subsequent indications or gestures from the user, so to control the text selection and its process. For instance, in one embodiment, the device may interpret a subsequent drag gesture towards the bottom of the display or the available text that it receives as a request to resume (or, in one embodiment, to start) the text selection. The distance between the point of contact of the touch gesture (e.g., press gesture) that triggered the initial text selection and the resting position or location of the subsequent drag gesture (e.g., the user contact having not lost contact with the screen or display and remaining in place at the resting position or location, thereby, according to one embodiment, transitioning to or causing the device to interpret it as another press gesture which is to be distinguished from the original press gesture) may also inform the device an intended speed or relative speed of the text selection. It may also interpret a subsequent drag gesture towards the top of the display (or the top of the available text) that it receives as a request to decrease the speed or relative speed of text selection. The device may also interpret a subsequent upward drag gesture arriving at or close to the point of contact of the original press gesture that it receives as a request to pause the text selection. Likewise, a subsequent drag gesture travelling from the point of contact of the original press gesture (or from an imaginary line horizontally across the point of contact of the original press gesture) towards the top of the display (or the top of the available text) may cause the device to deselect text (i.e., removing one or more characters or words from the text selection), and the distance between the point or location of contact of the original press gesture and the resting location of the drag gesture may inform the speed of text deselection. A subsequent drag gesture that rests on or near the point of contact of the original press gesture would cause the device to stop the text deselection. Note that the area or location on the display where additional characters, words and/or punctuations may be shown, the additional characters, words and/or punctuations being selected or deselected in response or relation to these drag gestures, does not need to correspond to the same area(s) or location(s) of the contact with the display made by or during the drag gesture responsible for adding to or removing them from the current text selection. In one embodiment, drag gestures towards the bottom of the display (or the bottom of the available text) from the point of contact of the original press gesture may cause a device equipped with a touchscreen display to select text in increments of word, and drag gestures towards the top of the display (or the top of the available text) from the contact point of the original press gesture may cause it to deselect text in increments of words, while drags gestures towards the right and those towards the left may cause it to select and deselect text in increments of character respectively. In another embodiment, a downward drag gesture from the point of contact of the original press gesture may result in incremental text selection towards the (e.g., not yet selected, consecutive) characters, words, and/or punctuations in the available text that are adjacent to the end of the currently selected text, and those in any of the following lines in the available text. An upward drag gesture from the point of contact of the original press gesture may result in incremental text deselection, starting from the end of the currently selected text. A rightward drag gesture from the point of contact of the original press gesture may cause the device to select text incrementally towards the (e.g., not yet selected, consecutive) characters, word and/or punctuations in the available text that are adjacent to the beginning of the currently selected text, and those in any of the preceding lines in the available text. A leftward gesture from the point of contact of the original press gesture may cause the device to deselect text incrementally, starting from the beginning of the currently selected text.

According to one embodiment, a threshold or range of distance between the resting location of a subsequent drag gesture and the point of contact of the original press gesture may cause the device to select or deselect in increments of character, while another threshold or range of distance may cause it to select or deselect in increments of word. There may be yet another range for increments of line. In one embodiment, the threshold or range for increments of character is closer to the point of contact of the original press gesture than the threshold or range for increments of word. In another embodiment, the threshold or range for increments of word is closer to the point of contact of the original press gesture than the range for increments of line.

Many variations in embodiments may be developed or otherwise derived based on the disclosure herein, such as drag gestures that travel in arc, or text selection control based on recognizable patterns made by user touch that originated from a press gesture and stayed in contact with the display, or a touch or pattern gesture that triggers the initial text selection and subsequently loses contact with the display, while anticipating or accepting one or more drag gestures to control the text selection and its process. As such, any derivation or adaptation is within the scope of various embodiments.

For instance, a non-transitory computer-readable storage device is also disclosed, wherein the device may comprise instructions stored therein that, when executed by one or more programmable processors, cause the one or more programmable processors on a computing device to (a) identify an indication of a first gesture, wherein the first gesture comprises user contact with a touch-sensitive surface associated with the computer device; (b) determine that the user contact stays within a pre-defined distance from a location on the touch-sensitive surface, wherein the location is associated with text that is displayed on a display, and the location is associated with the first gesture; (c) in relation to determining that the user contact stays within the pre-defined distance, present at the display an indication of text selection, wherein the text selection increases temporally to comprise additional text, independently of additional user contact with the touch sensitive surface; and (d) in relation to determining that the touch sensitive surface is free of the user contact, present at the display an indication of the text selection, wherein the text selection stops increasing. According to an embodiment, the computing device is capable of identifying a tap gesture. In another embodiment, the computing device is further capable of identifying or distinguishing among two or more types or kinds of tap gesture. For instance, there may be a first kind of tap gesture that is associated with lighter or heavier touch or degree of touch with the touchscreen display than a second kind of tap gesture, where the second kind of tap gesture is interpreted by the computing device as a regular tap gesture, and the first kind as a special tap gesture. In one embodiment, a special tap gesture may cause the computing device to provide an initial text selection and enable the user to use drag gestures (such as those described above) to further select or deselect text and control the process (e.g., the speed of text selection and deselection).

In one embodiment, a special tap gesture may take the place of, or act equivalently to, a press gesture that may initiate the text selection and deselection process, where the special tap gesture would entail loss of contact with the display, and the computing device may receive for new user contact (such as a drag gesture) to continue. In one embodiment, the point of contact on the display made by the original special tap gesture provides a reference for the device to interpret downward, upward, rightward and leftward gestures (such as drag gestures). In another embodiment, the initial point of contact on the display made by a drag gesture (or the point of contact on the display made by a press gesture) that was made after the special tag gesture may establish such a reference. In yet another embodiment, each subsequent drag or press gesture causes the device to re-establish such a reference based on its initial point of contact on the display, and the computing device would pause the text selection or its process when the user contact associated with the current drag or press gesture is lost. Upon receiving or detecting a gesture other than the gesture(s) that the computing device interprets as resuming or pausing text selection (e.g., in one embodiment, a drag or press gesture to pause or resume, and a regular tap or special tag gesture to start or end), the device may indicate to the user that the text selection process is complete, for example, by prompting the user for further instructions regarding the selected text. For instance, for a text selection from the text of a message associated with a sender, the device may store the selected text and the sender or author information in a memory location (e.g., clipboard), for example, by looking up the metadata associated with the message in a file or database embedded in or local to the device. Upon receiving a request from the user (e.g., via a pop-up menu on the display) to paste the text selection to a document (e.g., another text message or draft), the device may place not only the selected text, but also the sender or author information to the location of the document indicated by the user (e.g., as part of the request), along with a textual or visual hint or indication that the selected text is from another message. In one embodiment, the device may also capture and store the time information of the message, and make it available for further operation (e.g., pasting). In another embodiment, the device may present the user an option of pasting just the selected text, and another option of pasting the additional information (such as sender and time information). In yet another embodiment, the device may identify the originator, author, or sender of selected text as "I" or "me" (e.g., when pasting the selected text and adding additional information to the document), if the message from which the text was extracted was originated from, authored by, or sent by the user.

Figure 18:
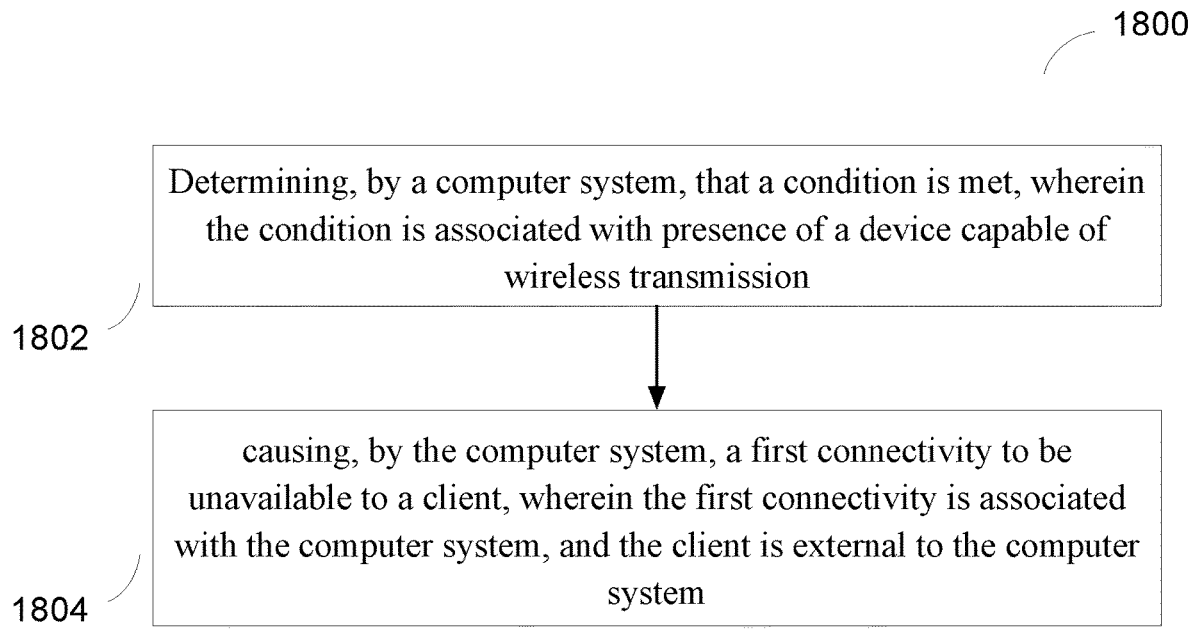
FIG. 18 shows a tenth computerized method in accordance with an embodiment.

With the mobility and the limited battery capacity of a portable wireless device and the different cost or cost structure between a cellular data plan and a home or mains electricity-powered Wi-Fi service comes the changing priority of desirability of Internet connection or connectivity for a mobile device or mobile client. For example, a mobile hot-spot device may provide a Wi-Fi connection to a mobile client via a cellular data connection between the mobile hot-spot and a cellular base station. It may no longer be a desirable connection, however, when the mobile client is in the vicinity of a home Wi-Fi service that the mobile client has access to. FIG. 18 shows a flow diagram of an exemplary process 1800 for causing such a mobile client to choose a desirable connection among two or more possibilities. Per the example process 1800, a computer system such as the mobile hot-spot device may determine that a condition is met, wherein the condition is associated with presence of a device capable of wireless transmission (1802). For instance, the computer system may determine that a connectivity or a network connection is available. For example, the mobile hot-spot device may detect a network identifier (e.g., ESSID) of the home Wi-Fi service, and this condition or detection indicates presence of a router capable of wireless transmission or communication. In one embodiment, such a network identifier is provided or otherwise identified by the user of the computer system (e.g., the mobile hot-spot device) or mobile client, and stored in the system, so that the system may recognize the identifier as indicating the presence of a service which may also provide an internet connection to the mobile client. In another embodiment, the mobile client or an application on the mobile client, with the permission or input from the user, may provide this information to the computer system.

The computer system may cause a first connectivity to be unavailable to a client, wherein the first connectivity is associated with the computer system, and the client is external to the computer system (1804). For instance, the computer system may cause another connectivity or another network connection to be unavailable, wherein the other connectivity or the other network connection is associated with the computer system. For example, the computer system (e.g., the mobile hot-spot device) may unilaterally disconnect an existing connection with or refuse a connection or association request from the mobile client, thereby forcing the mobile client to switch to, or attempt to switch to, the home Wi-Fi service. In one embodiment, the computer system may stop advertising its service (e.g., stop broadcasting its network identifier). In one embodiment, when the computer system determines that the home Wi-Fi service is no longer available, accessible, or reachable, it may re-establish a connection or connectivity with the mobile client, for example, by accepting a connection or association request from the mobile client. It may also rebroadcast its network identifier if it has previously stopped doing so.

In one embodiment, in relation to disconnecting or refusing connection with the mobile client, the computer system (e.g., a Wi-Fi hotspot device) may disconnect its cellular connection or connectivity, or shut or power down the component(s) responsible for it, so to conserve power or battery. In another embodiment, the computer system may disconnect its Wi-Fi connection or connectivity, or shut or power down the component(s) responsible for it. In yet another embodiment, the computer system may turn off itself completely (e.g., requiring tactile control from the user on the computer system to turn it back on), or put itself in a sleep or standby mode that could wake up periodically or receive an external stimulus, signal, or request.

In one embodiment, the computer system (e.g., a Wi-Fi hotspot device) may determine a wireless network provided by or otherwise associated with the home Wi-Fi service is indeed available to the mobile client, for example, by attempting to connect to the wireless network. For instance, the computer system may connect to the internet or the Web via the wireless network associated with the home Wi-Fi service, so to determine if the service is functional (e.g., successfully associating with the service, receiving an IP address from the service, and/or receiving a response from a request sent to a server on the Web), before disconnecting the mobile client, or refusing its request to associate or connect.

In another embodiment, the computer system may determine that a connectivity with the home Wi-Fi service is available based on at least information provided by a user. For instance, the computer system may attempt to access the service by being authenticated with the service using credentials specified beforehand by the user and stored in a non-volatile memory on the computer system. (In one embodiment, such credentials may comprise a user identifier and password against a network identifier associated with the service.) Should the authentication fail, the computer system may not disconnect its Wi-Fi connection with or reject a request to connect from the mobile client. For example, the computer system may receive one or more requests from a Wi-Fi access point or router associated with the service, wherein the one or more requests may comprise an authentication request. The computer system may send one or more responses to the Wi-Fi access point or router, wherein the one or more responses may comprise an authentication response, wherein, for example, the authentication response comprises credentials provided by the user and stored on the computer system. Upon successfully authentication, the computer system and the Wi-Fi access point or router may exchange one or more association requests and responses.

In one embodiment, the computer system (e.g., a Wi-Fi hotspot device) may monitor the viability or health of the home Wi-Fi service, for example, by sending a request to a server available on the Web periodically, and expecting a response. Should it determine that the service is not viable or otherwise inaccessible, the computer system may connect with the mobile client, for example, by broadcasting its network identifier and accepting a request to connect or associate from the mobile client.

Figure 19:
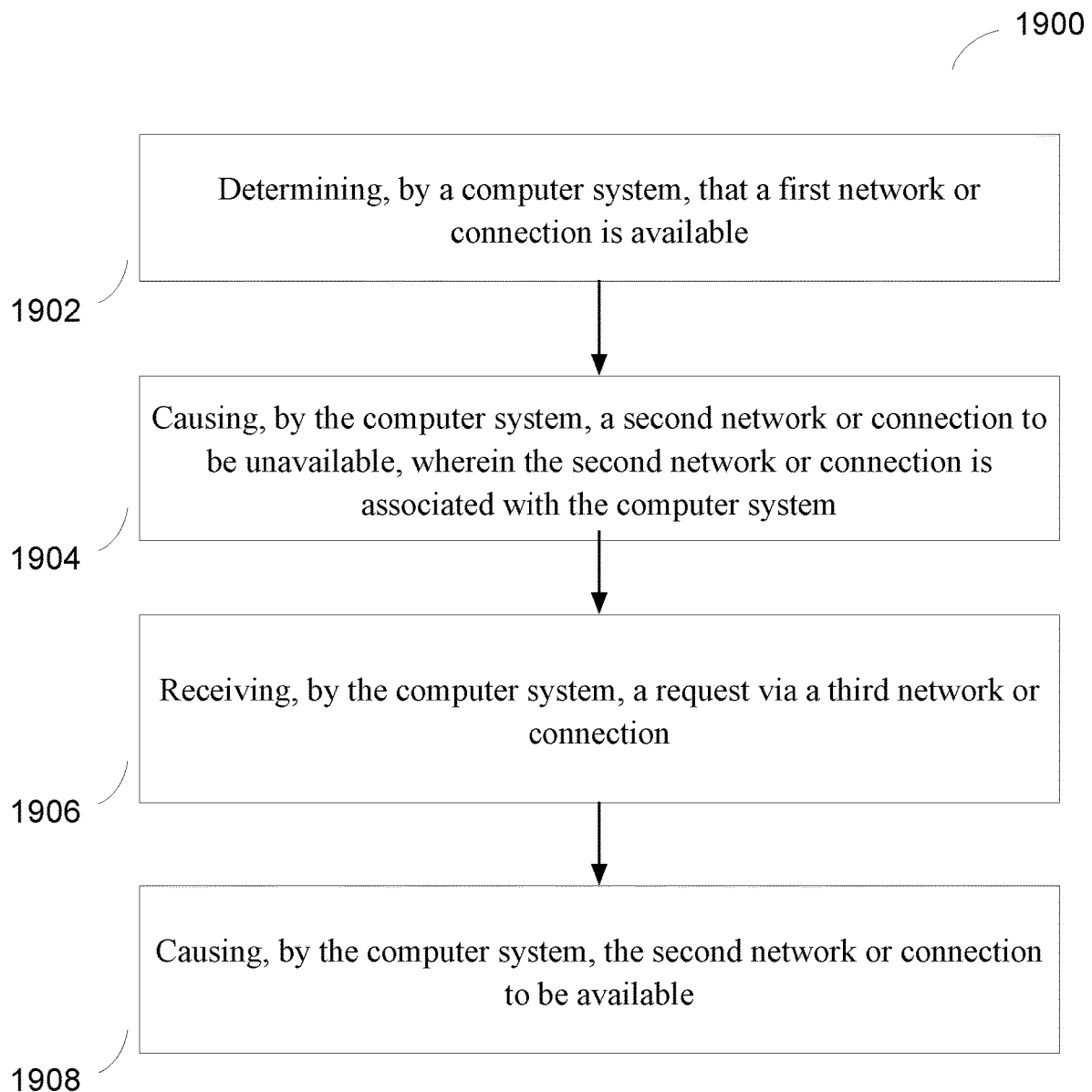
FIG. 19 shows an eleventh computerized method in accordance with an embodiment.

In another embodiment, the computer system (e.g., a Wi-Fi hotspot device) may rely on an external stimulus or request to enable a connection with the mobile client. FIG. 19 shows a flow diagram of an exemplary process 1900 for a computer system that may respond to such an external stimulus or request. Per the example process 1900, a computer system may determine that a first network or connection is available (1902). For instance, the computer system may detect a recognizable network identifier associated with a wireless network, and has successfully connected to the network. The computer system may cause a second network or connection to be unavailable, wherein the second network or connection is associated with the computer system (1904). For instance, the computer system may disconnect or reject a connection request from the mobile client, thereby creating a condition where the mobile client would request a connection or association with the service. The computer system may later receive a request or an external stimulus via a third network or connection (1906). For instance, the computer system may receive a request (e.g., a Wake-On Bluetooth request, a Wake-On LAN request, or something similar from the mobile client) via a different network or communication interface, such as Bluetooth, which may require meaningfully less power than a Wi-Fi network or connection, while it might provide less coverage in distance. In one embodiment, the computer system equipped with a Wi-Fi interface, a Bluetooth interface and a cellular interface may choose to disable the Wi-Fi interface and the cellular interface when it has detected the presence of a Wi-Fi network accessible to the mobile client. In such a mode or at such a setting, the computer system may preserve a great deal of power while enabling the mobile client to request for an internet connection (e.g., when the client loses connection or connectivity with the Wi-Fi network). The computer system may then cause the second network or connection to be available (again) (1908). In one embodiment, after having received the request through the alternative or different interface (i.e., the third network or connection), the computer system may wait for a pre-configured, pre-defined, or algorithmically determined or generated amount of time before attempting to detect or determine the presence of a home or free Wi-Fi network accessible to the mobile client. In one embodiment, an application on the mobile client may monitor the viability or health of the home or free Wi-Fi network, and send a request to the computer system so to activate its Wi-Fi interface or network (i.e., the second network or connection).

Figure 20:
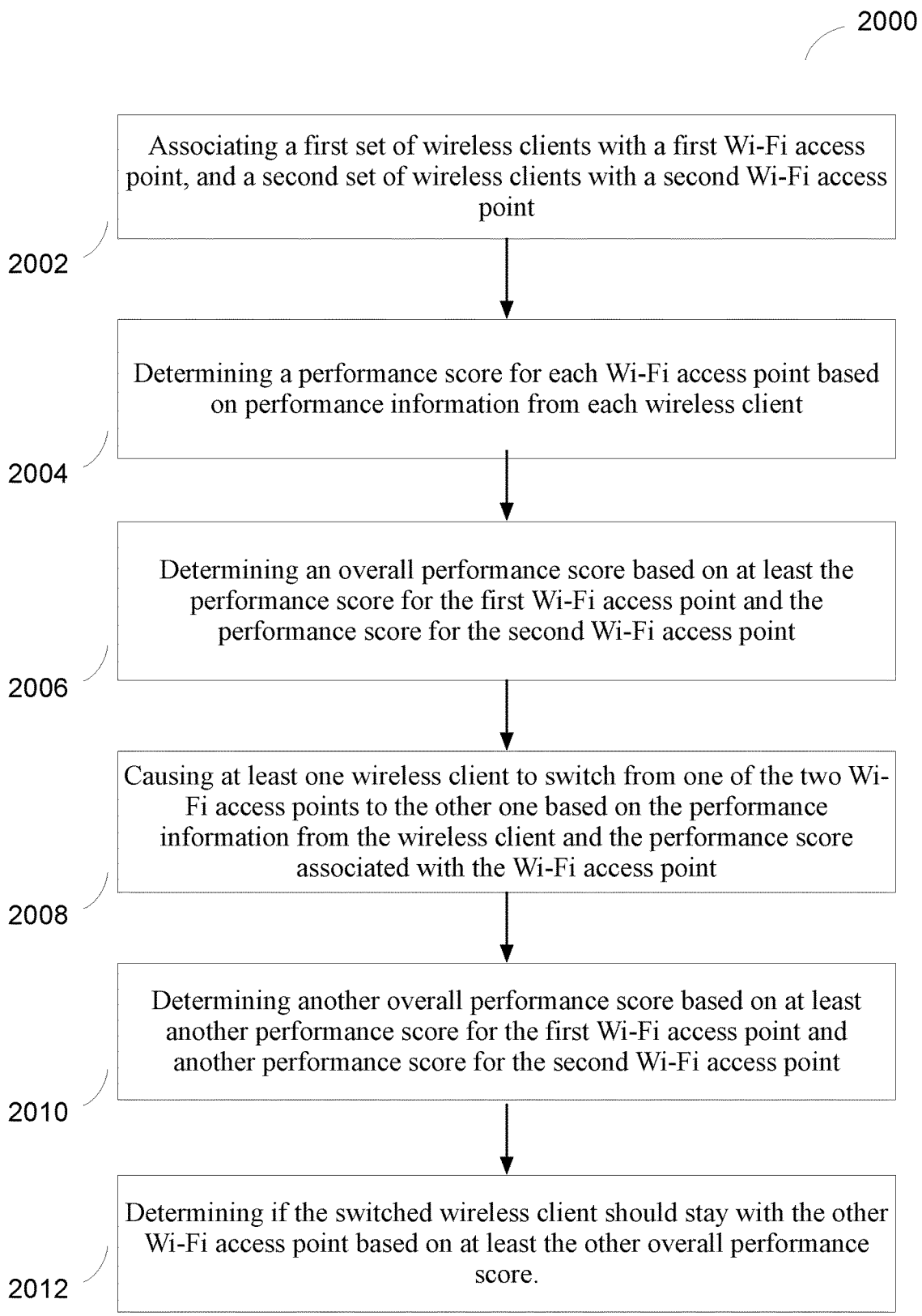
FIG. 20 shows a twelfth computerized method in accordance with an embodiment.

A wireless client such as a mobile phone or a mobile hot-spot device may have more than one access point choice in a wireless network or more than one wireless network choice to associate with or connect to, and it often relies on signal strengths or link quality as the primary factors in choosing the access point or the network, given that the wireless client has access rights to these available access points and networks. FIG. 20 shows a flow diagram of an exemplary process 2000 for a wireless network to optimize the overall throughput or quality of service in relation a plurality of access points and a plurality of wireless clients. Per the example process 2000, a wireless network may associate a first set of wireless clients with a first Wi-Fi access point, and a second set of wireless clients with a second Wi-Fi access point (2002). For instance, one or more wireless clients may be connected to an access point, while another set of one or more wireless clients be connected to another access point. The wireless network may determine a performance score for each Wi-Fi access point based on performance information from each wireless client (2004). For instance, the wireless clients may track and log the download speed over a period of time, and send the information to a server accessible through the wireless network, and the server may in turn determine an average download speed (e.g., per wireless client) for each Wi-Fi access point for a given time period or span. The wireless network may determine an overall performance score based on at least the performance score for the first Wi-Fi access point and the performance score for the second Wi-Fi access point (2006). For instance, the server may determine an overall download speed for the whole network for the given time period or timespan. The wireless network may cause at least one wireless client to switch from one of the two Wi-Fi access points to the other one based on the performance information from the wireless client and the performance score associated with the Wi-Fi access point (2008). For instance, the server may identify one or more wireless clients whose individually reported download speed is less than the average speed associated with the access point that the one or more wireless clients are using, and disconnect or otherwise force these wireless clients to connect to another access point. The wireless network may then determine another overall performance score based on at least another performance score for the first Wi-Fi access point and another performance score for the second Wi-Fi access point (2010). For instance, after the switching of Wi-Fi access point for some of the wireless clients in the network, and the lapse of another period or span of time, the server may determine a new average download speed, score, or rating for each Wi-Fi access point, and a new overall performance score based on these new Wi-Fi access point speeds, scores, or ratings. The wireless network may determine if the switched wireless client should stay with the other Wi-Fi access point based on at least the other overall performance score (2012). For instance, the server may determine that the switching should be reverted because the new overall score is worse than the old overall score. In one embodiment, the server may continually or periodically optimize the overall network speeds, scores or ratings by switching wireless clients against different access points. In another embodiment, such determination or decision may also be based on the individual Wi-Fi scores in lieu of or in addition to the overall network speed, score or rating.

As indicated earlier, the embodiments discussed herein are illustrative of the present invention. The various procedures described herein may be implemented with hardware or software, or a combination of both. The invention may be implemented with non-transitory computer-readable storage media and/or computer-readable communication media.

Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of any applicable claim.

What is claimed:

1. A computer-implemented method, comprising:
providing a first device, by a second device, access to a network via a first wireless connectivity;
determining, by the second device, a condition, wherein the condition comprises identification of a second wireless connectivity; and
causing, by the second device, the first wireless connectivity to be unavailable to the first device, wherein the first device accesses the network via the second wireless connectivity.

2. The method of claim 1, wherein determining the condition comprises determining that a Service Set ID (SSID) or an Extended Service Set ID (ESSID) is available, wherein the SSID or the ESSID is associated with the second wireless connectivity.

3. The method of claim 2, wherein determining that the Service Set ID (SSID) or the Extended Service Set ID (ESSID) is available comprises receiving an internet protocol address, wherein the internet protocol address is associated with the second wireless connectivity.

4. The method of claim 2, wherein determining that the Service Set ID (SSID) or the Extended Service Set ID (ESSID) is available comprises authenticating successfully with a wireless network, wherein the wireless network is associated with the Service Set ID (SSID) or the Extended Service Set ID (ESSID).

5. The method of claim 2, wherein determining that the Service Set ID (SSID) or the Extended Service Set ID (ESSID) is available comprises in relation to a request, receiving an indication of success via the second wireless connectivity.

6. The method of claim 5, wherein receiving the indication of success comprises receiving a status code indicating success from a server available on the World Wide Web, wherein the status code is associated with the Hypertext Transfer Protocol.

7. The method of claim 1, wherein causing the first connectivity to be unavailable comprises causing the second device to turn off the first wireless connectivity, wherein the first device is within a geographically communicative range associated with the first connectivity.

8. The method of claim 2, wherein determining that the Service Set ID (SSID) or the Extended Service Set ID (ESSID) is available comprises establishing a connectivity with a wireless network, wherein the wireless network is associated with the Service Set ID (SSID) or the Extended Service Set ID (ESSID).

9. The method of claim 1, further comprising:
receiving, by the second device, information from a user;
storing, by the second device, the information; and
wherein determining the condition comprises determining that the second wireless connectivity is available based on at least the information, wherein the information comprises identification associated with a wireless network, and the second wireless connectivity is associated with the wireless network.

10. The method of claim 1, wherein determining the condition comprises determining that the second wireless connectivity is available based on at least information provided by a user, and the information comprises identification associated with the second wireless connectivity.

11. The method of claim 10, wherein determining the second wireless connectivity is available comprises:
sending, by the second device, one or more requests;
in relation to the one or more requests, receiving, by the second device, one or more responses, wherein the one or more responses are associated with a wireless network, and the second wireless connectivity is associated with the wireless network; and
in relation to receiving the one or more responses, associating, by the second device, with the wireless network.

12. The method of claim 11, further comprising:
wherein the one or more requests comprise an authentication request, and the one or more responses comprise an authentication response; and
wherein associating with the wireless network comprises in relation to sending an association request, receiving an association response, wherein the association request and the association response are associated with the wireless network.

13. The method of claim 1, further comprising:
in relation to determining that the second wireless connectivity is unavailable, causing a third wireless connectivity to be available to the first device, wherein the third wireless connectivity is associated with the second device.

14. The method of claim 1, wherein determining the condition comprises in relation to determining that the second wireless connectivity is available, determining that a wireless network is available, wherein the second wireless connectivity is associated with an identification associated with the wireless network.

15. The method of claim 1, further comprising:
receiving, by the second device, information from the first device; and
wherein determining the condition comprises in relation to determining that the second wireless connectivity is available, determining that a wireless network is available based on the information, wherein the information comprises an identification of the wireless network.

16. The method of claim 1, further comprising:
associating, by the second device, a first set of wireless clients;
determining, by the second device, a performance score for each of the wireless clients in the first set;

wherein determining the condition comprises:
sending, by the second device, individual performance scores associated with the wireless clients to a server;
receiving, by the second device, a request from the server, wherein the request identifies a wireless client; and
determining, by the second device, a wireless connectivity associated with said wireless client; and
wherein causing the first connectivity to be unavailable to the first device comprises causing said wireless connectivity to said wireless client to be unavailable.

17. The method of claim 16, further comprising:
associating, by a third device, a second set of wireless clients;
determining, by the server, a first performance score for the second device in relation to the first set of wireless clients and a second performance score for the third device in relation to the second set of wireless clients;
determining, by the server, an overall performance score based on at least the first performance score and the second performance score;
in relation to causing the first connectivity to the first device to be unavailable, sending, by the second device, a message to the server, wherein the message indicates that the first device has been disconnected;
in relation to receiving the message and waiting for a pre-defined period of time, determining, by the server, another overall performance score based on at least another performance score associated with the second device, and another performance score associated with the third device; and
in relation to determining, by the server, that the other overall performance score is worse than the overall performance score, sending, by the server, another request to the second device or the third device to have the first device disconnected.

18. The method of claim 1, wherein the second device is communicatively coupled to the first device prior to causing the first wireless connectivity to be unavailable to the first device.

19. The method of claim 1, wherein the second device is communicatively coupled to the first device via the first wireless connectivity prior to causing the first wireless connectivity to be unavailable to the first device.

20. A system comprising:
one or more processors; and
one or more memories communicatively coupled to the one and more processors when the system is operational, the one or more memories bearing processor-executable instructions that, when executed by the one or more processors or on the system, cause the system at least to:
provide a first wireless connectivity to a device;
determine a condition, wherein the condition is associated with identification of a second wireless connectivity; and
cause the first wireless connectivity to be unavailable to the device, wherein the system is physically external to the device.

21. The system of claim 20, wherein the instructions that, when executed by the one or more processors or on the system, cause the system at least to determine the condition, further causes the system at least to:
determine the condition independently of the device.

22. The system of claim 20, wherein the instructions that, when executed by the one or more processors or on the system, cause the system at least to cause the first wireless connectivity to be unavailable, further causes the system at least to:
cause independently of the device the first wireless connectivity to be unavailable.

23. The system of claim 20, wherein the instructions that, when executed by the one or more processors or on the system, further cause the system at least to:
cause the device to connect to the internet via the second wireless connectivity, wherein the internet is accessible to the device via the first wireless connectivity prior to causing the first wireless connectivity to be unavailable to the device.

24. The system of claim 20, wherein the instructions that, when executed by the one or more processors or on the system, cause the first wireless connectivity to be unavailable, further causes the system at least to:
cause the first wireless connectivity to be unavailable, wherein the internet is accessible to the device via the second wireless connectivity, the internet is inaccessible to the device via the first wireless connectivity after the first wireless connectivity is caused to be unavailable, and the internet is accessible to the device via the first wireless connectivity before the first wireless connectivity is caused to be unavailable.

25. A non-transitory computer-readable storage medium bearing computer-readable instructions that, when executed on a computer, cause the computer to perform operations comprising:
providing a first wireless connectivity or connection to a device;
determining a condition, wherein the condition is associated with identification of a second wireless connectivity or connection; and
causing the first wireless connectivity or connection to be unavailable to the device, wherein the computer is physically external to the device.

26. The non-transitory computer-readable storage medium of claim 25, further bearing computer-readable instructions that, when executed on the computer, cause the computer to perform operations comprising:
causing the device to connect to the internet via the second wireless connectivity or connection.

* * * * *